US010489007B2

(12) United States Patent
Vaglio

(10) Patent No.: US 10,489,007 B2
(45) Date of Patent: Nov. 26, 2019

(54) CONTEXTUALIZED APPLICATION EVALUATION

(71) Applicant: CERNER INNOVATION, INC., Kansas City, KS (US)

(72) Inventor: Jay Christopher Vaglio, Kansas City, KS (US)

(73) Assignee: CERNER INNOVATION, INC., Kansas City, KS (US)

( * ) Notice: Subject to any disclaimer, the term of this patent is extended or adjusted under 35 U.S.C. 154(b) by 660 days.

(21) Appl. No.: 14/980,140

(22) Filed: Dec. 28, 2015

(65) Prior Publication Data

US 2017/0185253 A1 Jun. 29, 2017

(51) Int. Cl.
*G06F 3/00* (2006.01)
*G06F 9/00* (2006.01)
*G06F 17/00* (2019.01)
*G06F 3/0481* (2013.01)

(52) U.S. Cl.
CPC .. *G06F 3/0481* (2013.01); *G06F 2203/04804* (2013.01)

(58) Field of Classification Search
CPC .. G06F 3/0484; G06F 11/3886; G06F 3/0482; G06F 3/0481; G06F 2203/04804
See application file for complete search history.

(56) References Cited

U.S. PATENT DOCUMENTS

| | | | | |
|---|---|---|---|---|
| 9,015,592 | B2* | 4/2015 | Gandhi | G06F 11/3688 715/733 |
| 2004/0015846 | A1* | 1/2004 | Haisraeli | G06F 9/52 717/115 |
| 2005/0204343 | A1* | 9/2005 | Kisamore | G06F 11/3688 717/124 |
| 2009/0235172 | A1* | 9/2009 | Gandhi | G06F 11/3688 715/733 |
| 2012/0306748 | A1* | 12/2012 | Fleizach | G06F 3/033 345/161 |
| 2013/0212521 | A1* | 8/2013 | Fedoseyeva | G06Q 10/00 715/781 |
| 2015/0161031 | A1* | 6/2015 | Chea | G06F 11/3664 717/125 |

\* cited by examiner

*Primary Examiner* — Kieu D Vu
*Assistant Examiner* — Anita D. Chaudhuri
(74) *Attorney, Agent, or Firm* — Shook, Hardy and Bacon LLP

(57) ABSTRACT

Systems and methods for providing an evaluation tool for evaluating functionality and performance of applications are provided herein. The systems and methods described herein provide mechanisms for, among other things, providing contextualized evaluations of applications by tracking interactions with the evaluation tool, receiving evaluation criteria for assessing the application, and capturing rendered displays during an evaluation session.

20 Claims, 14 Drawing Sheets

FIG. 7

CONTEXTUALIZED APPLICATION EVALUATION

BACKGROUND

Past solutions have failed to provide a mechanism for adequately evaluating usability and functionality of computer applications prior to deployment in a live setting. Accordingly, applications are frequently released with functional and design flaws. Prior attempts to address this problem have included, for example, individual reviews. However, an individual's review of an application fails to account for contextual factors that influence a review. Additionally, an individual review commonly lacks details regarding the reviewer's perspective, such as culturally influenced interpretations and other ambiguities. Further, individual reviews have not been scalable, in that they only capture one individual's opinion regarding the quality of the application. Other attempts have included usability testing, which is costly and time-consuming, and usage analytics, which typically only provide passively tracked information.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Aspects herein generally relate to an evaluation tool that tool facilitates an assessment of usability, functionality, and/or design of an application, program or solution. The evaluation tool employs standardized evaluation criteria in order to enhance consistency across a large number of evaluations by multiple evaluators. The evaluation tool may be presented as a semi-transparent interface, so that a user interface of the application is visible and functional during an evaluation session. Further, evaluator interactions with the evaluation tool may be tracked and/or recorded during evaluation sessions. Accordingly, context of evaluation sessions may be preserved for later review. In effect, this allows a reviewer to experience an evaluation session from the perspective of the evaluator.

In one embodiment, a method for implementing an evaluation tool that facilitates evaluation of an application is described. The method may include providing an evaluation tool simultaneously with an application user interface. In some aspects, the evaluation tool is provided as a semitransparent overlay interface. In some aspects, the method includes receiving a user input for initiating an evaluation of at least one feature of the application user interface. Further, in some aspects, the method comprises providing an evaluation criteria user interface for displaying one or more evaluation criteria. Additionally, the method may include recording the user selection of the at least one evaluation criteria in association with the at least one feature of the application user interface, and capturing one or more screen images corresponding to the currently rendered display of the user device. In some aspects, the one or more screen images include an image depicting the user selection of the evaluation criteria. Further, the inputs, interactions, and images may be stored as a completed evaluation session.

In another embodiment, one or more computer storage media devices having computer-executable instructions embodied thereon for a method for reviewing evaluations completed using the evaluation tool. In accordance with aspects herein, the method may include receiving and storing one or more completed evaluation sessions for a first application. Additionally, the method may comprise determining an application performance score for each completed evaluation session of the one or more completed evaluation sessions. In some aspects, the method includes presenting an evaluation results user interface for displaying the application performance score for the completed evaluation sessions. Further, the method may include presenting at least one contextualized evaluation package corresponding to the completed evaluation sessions. Additionally, in some aspects, an evaluation package review user interface is provided for displaying selectable contextualized evaluation packages for providing a contextualized review of a completed evaluation session.

An additional embodiment describes a system for providing an evaluation tool is described. The system may include an evaluation tool user interface generating component for generating an evaluation tool for simultaneous display with an application user interface. Additionally, the system may include an evaluation criteria user interface generator for generating an evaluation criteria user interface for presenting one or more evaluation criteria having an associated a rating that represents a quality of a feature of the application user interface. In some aspects, the system may include an evaluation interaction tracking component for recording a user selection of the at least one evaluation criteria in association with the at least one feature of the application user interface. Further, the system may include a display capturing component for capturing screen images corresponding to the currently rendered display of the user device during an evaluation session.

BRIEF DESCRIPTION OF THE DRAWINGS

Illustrative embodiments of the present invention are described in detail below with reference to the attached drawing figures, which are incorporated by reference herein and wherein:

FIG. 7 is an illustrative depiction of an evaluation criteria user interface having a plurality of selectable rankings, in accordance with aspects herein;

DETAILED DESCRIPTION

Figure 1:
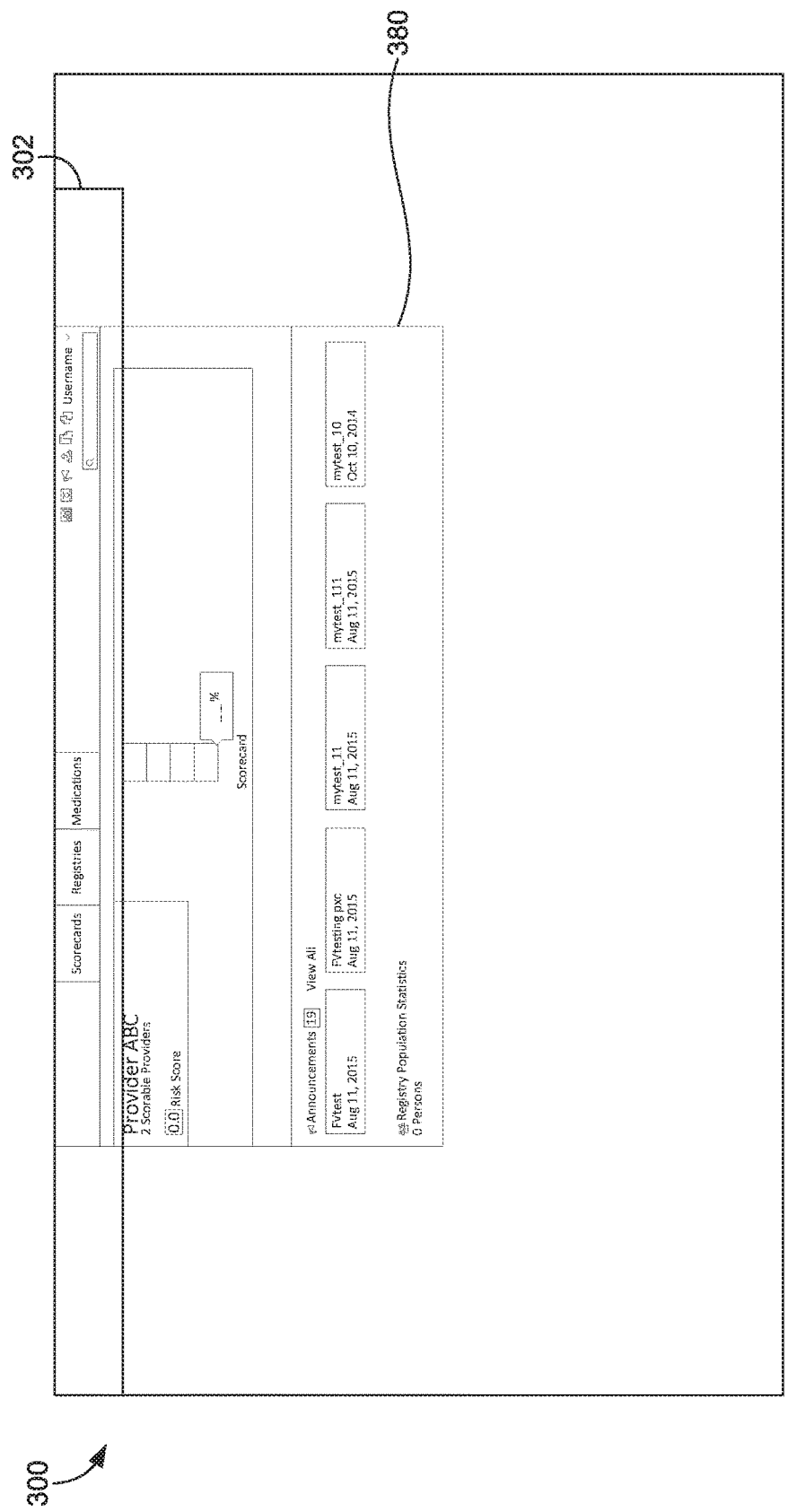
FIG. 1 is an illustrative depiction of a semi-transparent evaluation tool user interface overlaying an application user interface, in accordance with aspects herein.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As briefly mentioned above, aspects herein generally relate to an evaluation tool that tool facilitates an assessment of usability, functionality, and/or design of an application, program, or solution. The evaluation tool employs standardized evaluation criteria in order to enhance consistency across a large number of evaluations by multiple evaluators. Standardized evaluation criteria include evaluation criteria, which are standardized criteria for evaluating the adequacy of features of the application. The evaluation criteria may have a corresponding value or rating that represents the quality of a feature. Additionally, the evaluation tool may be presented as a semi-transparent interface, so that a user interface of the application is visible and functional during an evaluation session. Because both the application and the evaluation tool are operational and visible at the same time, an evaluator may add a critique or suggestion while they are interacting with the application user interface and without having to switch between interfaces. As used herein, the term "evaluator" generally refers to a user of the evaluation tool that is performing or has performed an evaluation of an application.

Further, evaluator interactions with the evaluation tool may be tracked and/or recorded during evaluation sessions. In some aspects, images or video of an evaluation session are captured. Additionally, an evaluator entry of a critique or assessment may be tracked and stored in association with a corresponding feature or location of the application user interface. Accordingly, context of completed evaluation sessions may be preserved for later review. Reviews may be performed by a "reviewer." As used herein, the term "reviewer" refers to a user that views evaluation session information after an evaluation session has been completed. For example, the reviewer may be a designer of the application, a user in a supervisory role, or other users that access evaluation session information. In effect, this allows a reviewer to experience an evaluation session from the perspective of the evaluator. Accordingly, a reviewer is able to see how and why a given feature of the application was assessed/critiqued in a certain way.

Turning now to more particular aspects, FIG. 1 shows an exemplary evaluation tool user interface 300 displayed simultaneously with an application user interface 380. Evaluation tool user interface 300 is represented by the bold lines in FIG. 1. As illustrated in FIG. 1, application user interface 380 is at least partially unobscured by evaluation tool user interface 300. In some aspects, evaluation tool user interface 300 may be generated as a semi-transparent overlay interface, such that the application user interface 380 is visible and accessible during an evaluation session. As can be appreciated, in other aspects, evaluation tool user interface 300 may be presented as an opaque overlay, a fully-transparent overlay, or any other suitable type of user interface. In some aspects, the evaluation tool user interface 300 may include one or more standard display feature representations 302, which generally provide a visual indication of a preferred layout of the application user interface 380. The standard display feature representations 302 will be discussed in more detail below with reference to FIGS. 1-6.

Figure 2:
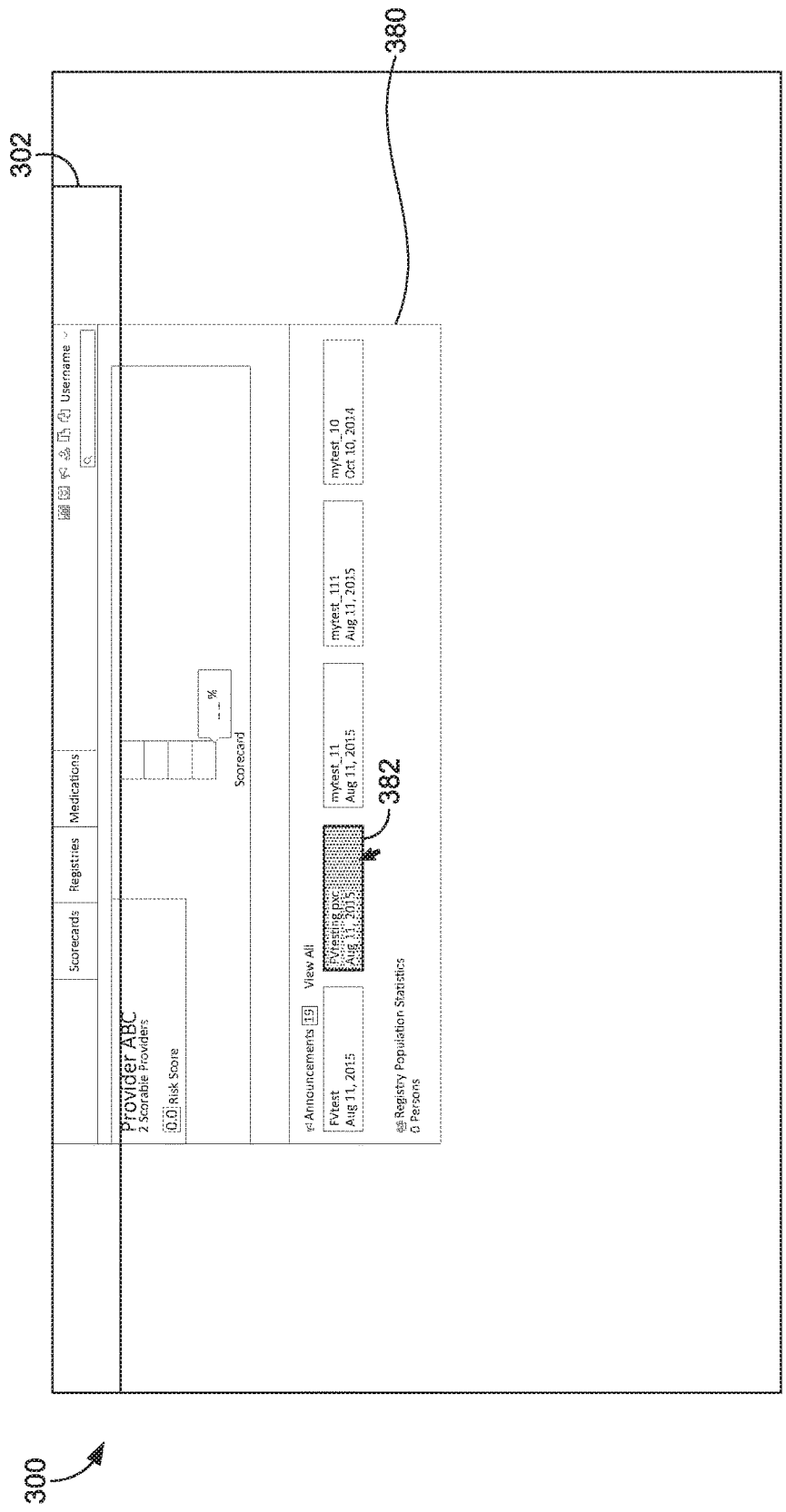
FIG. 2 is an illustrative depiction of a semi-transparent evaluation tool user interface and a functional application user interface, in accordance with aspects herein.

As mentioned above, functionalities of application user interface 380 remain accessible during an evaluation session. For example, as shown in FIG. 2, a graphical control element 382 of application user interface 380 is shown as being selected by a user. As used herein, a "graphical control element" generally refers to a selectable element, such as an icon, that causes the application to perform an action upon user selection. Accordingly, the evaluation tool may be used to assess live interactions with the application user interface 380, including display transitions and navigation from one screen to another.

Figure 3:
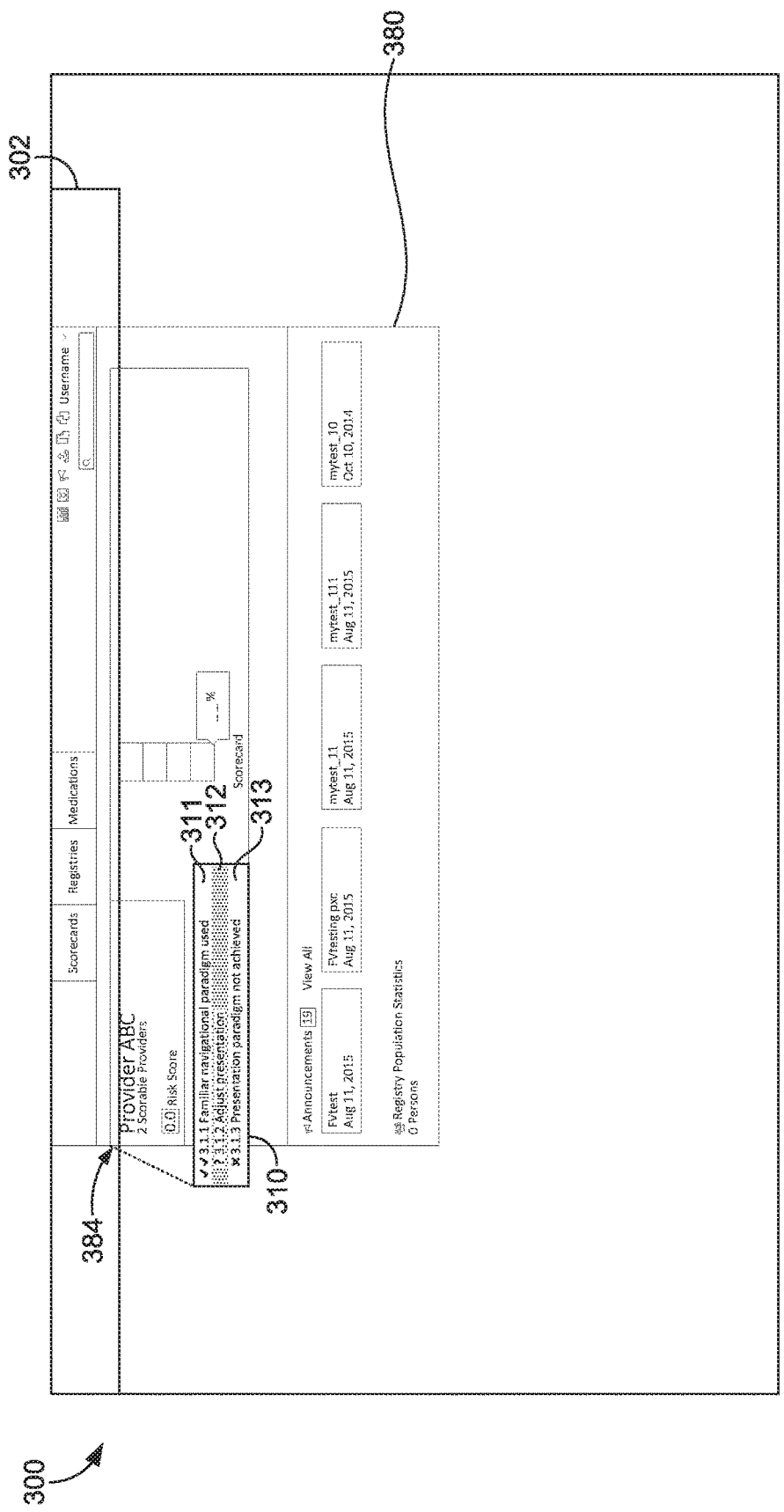
FIG. 3 is an illustrative depiction of an evaluation tool user interface with an evaluation criteria user interface for displaying evaluation criteria at a location corresponding to a user selection, in accordance with aspects herein.

Some examples of standardized criteria that may be used to evaluate an application will now be discussed. Evaluation tool user interface 300 may include an evaluation criteria user interface 310. Evaluation criteria user interface 310 may be a drop-down, or any other type of interface suitable for presenting evaluation criteria 311-313 for selection. As briefly discussed above, the evaluation criteria 311-313 are standardized criteria for evaluating features of the application and/or application user interface 380. Further, each evaluation criteria may have a corresponding value or rating that represents a quality of a feature of the application. For example, evaluation criteria 311-313 relate to "presentation" and may represent: a flawless rating (evaluation criteria 311); an intermediate rating (evaluation criteria 312); and/or an unsatisfactory rating (evaluation criteria 313). Although FIG. 3 shows three evaluation criteria, it should be appreciated that any number of evaluation criteria may be presented. Additionally, in some aspects, evaluation criteria user interface 310 may be configured to receive feedback, such as textual annotations, recorded audio, or any other type of evaluator feedback. In this aspect, evaluation criteria user interface 310 provides a means for an evaluator to enter free-form critiques and comments.

In some aspects, the evaluation criteria user interface 310 may be displayed upon receiving an evaluator selection of a feature of the application user interface 380, on a display of an evaluator device at a location corresponding to the received evaluator selection. For example, as shown in FIG. 3, an evaluator may select a specific location 384 within application user interface 380, which causes evaluation criteria user interface 310 to be displayed at specific location 384. In this example, specific location 384 corresponds to a portion of the application user interface 380 display that is outside of standard display feature representations 302. Continuing with this example, the evaluator may select evaluation criteria 312, which indicates that aspects of the presentation of application user interface 380 should be adjusted. The evaluator may select specific locations using a variety of input types or gestures, for example, a right-click, a double-click, a tap and hold gesture, a swipe gesture, or any number of other input types. As will be discussed in more detail below, the evaluation tool may store the selection of evaluation criteria 312 in association with specific location 384. Further, as will also be addressed in more detail below, the evaluation tool may capture screen images and/or video of a rendered display of the evaluator device when the selection is received.

Figure 4:
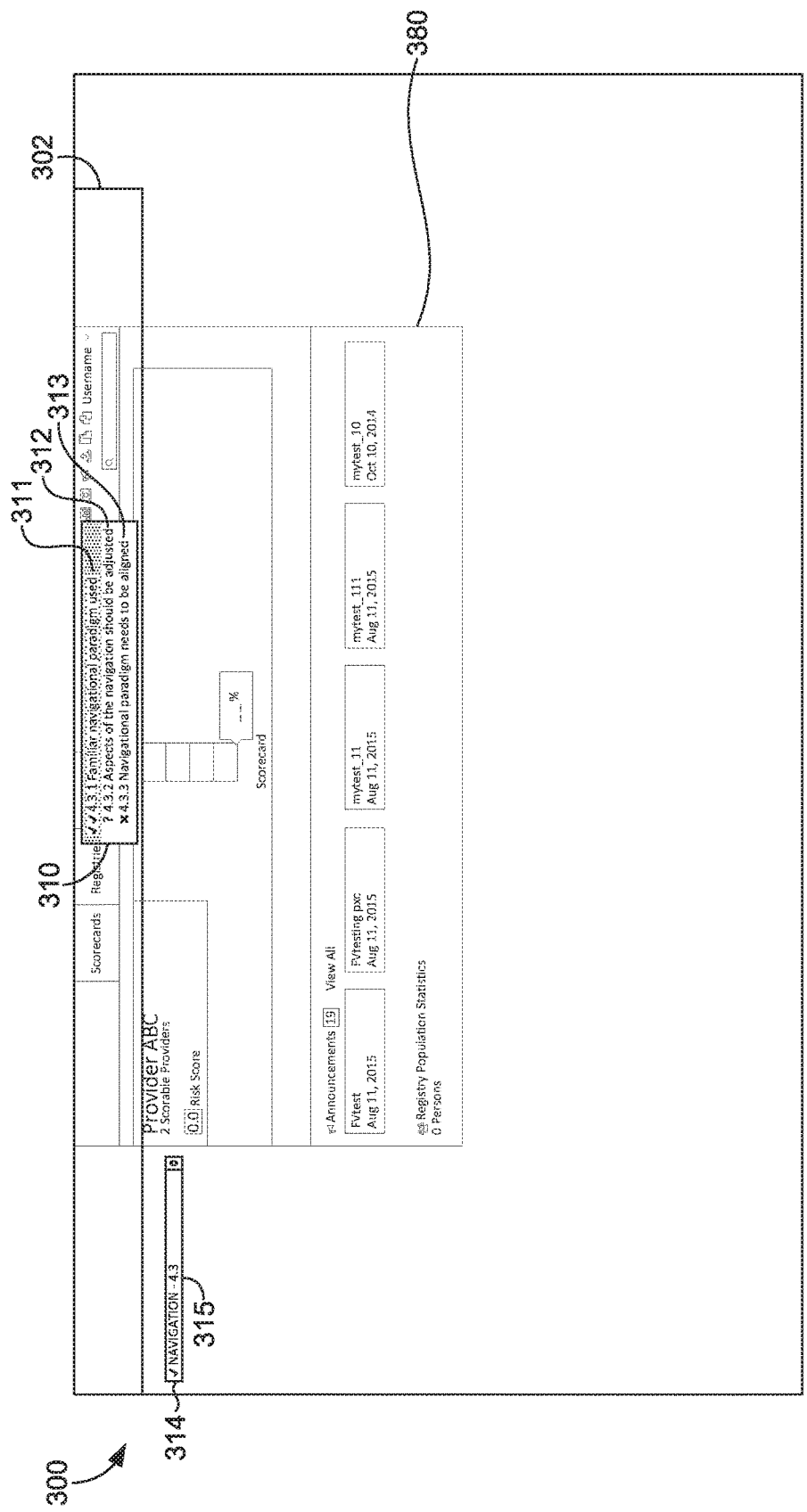
FIG. 4 is an illustrative depiction of an evaluation tool user interface with an evaluation criteria user interface for displaying evaluation criteria, in accordance with aspects herein.

In additional aspects, the evaluation criteria 311-313 may be organized by categories. In a non-limiting example, categories may include: presentation; transition; navigation; user experience; standardization; and innovation, among others. As illustrated in FIG. 4, the evaluation tool user interface 300 may include an evaluation criteria categories menu 314 that allows for selection of an evaluation criteria category 315. Once evaluation criteria category 315 has been selected, the evaluation criteria user interface 310 may display one or more selectable evaluation criteria 311-313 that correspond to the selected evaluation criteria category. For example, FIG. 4 shows a "navigation" evaluation criteria category 315 as being selected. Accordingly, when the evaluation criteria user interface 310 is displayed, each of the selectable evaluation criteria; 311 (familiar navigational paradigm used), 312 (aspects of the navigation should be adjusted), and 313 (navigational paradigm needs to be aligned), correspond to the "navigation" evaluation criteria category 315. As can be appreciated, any number of evaluation criteria categories may be presented for selection. For example, an evaluator could select a "page transition" evaluation criteria category, and, as a result, evaluation criteria relating to "page transition" would be presented.

Figure 5:
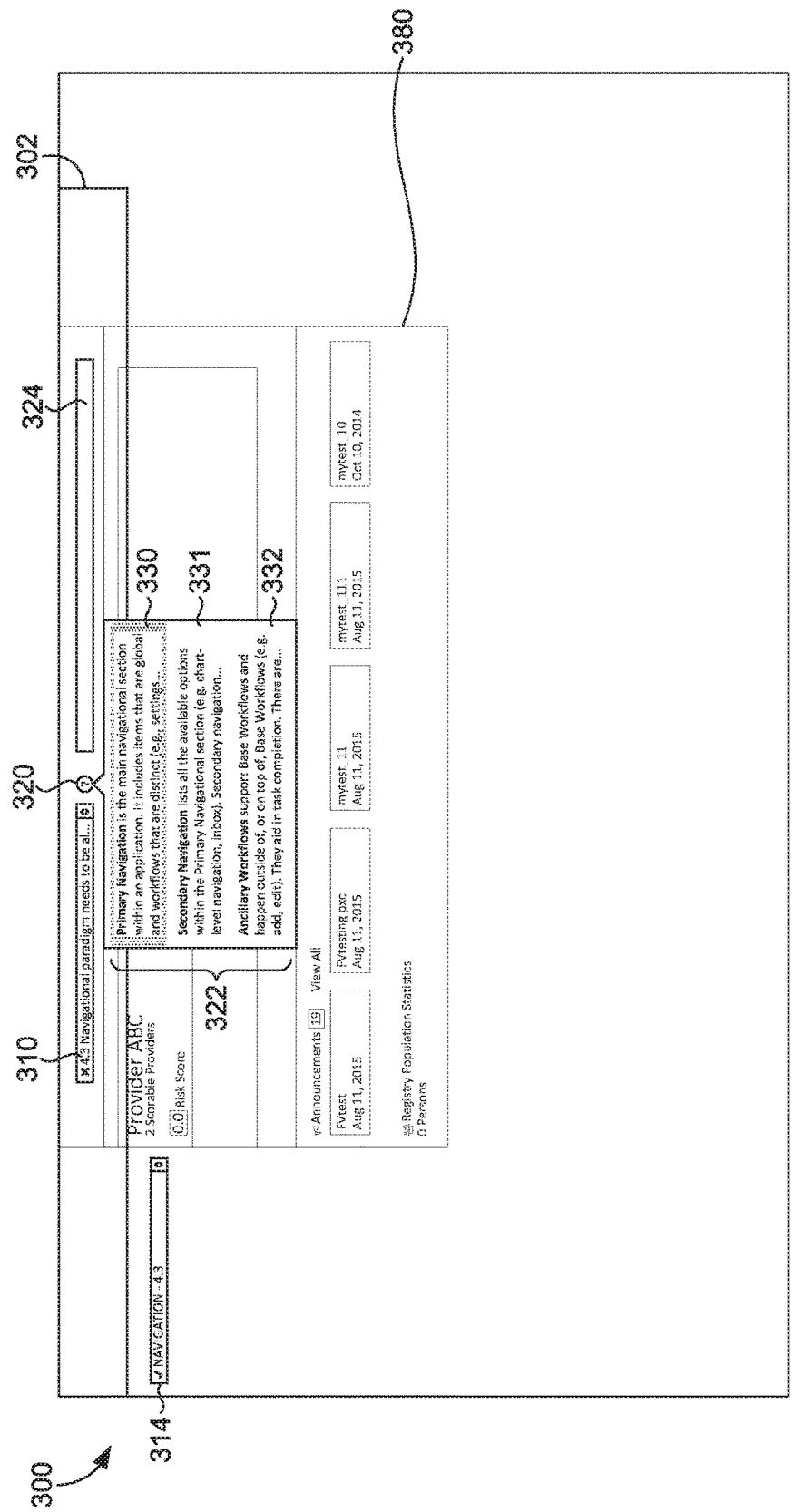
FIG. 5 is an illustrative depiction of an evaluation tool user interface having one or more evaluation criteria categories having associated evaluation criteria, in accordance with aspects herein.
Figure 6:
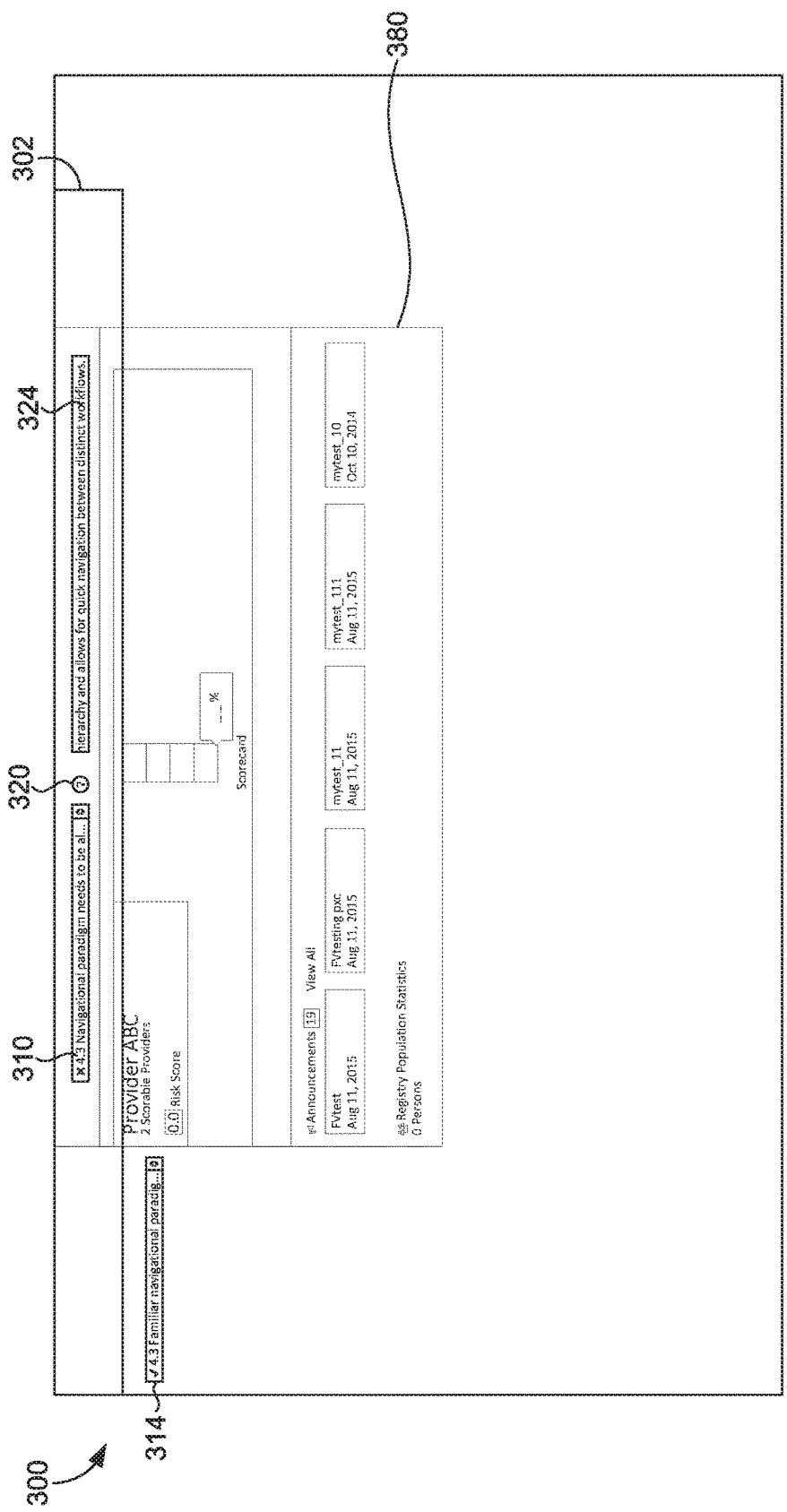
FIG. 6 is an illustrative depiction of an evaluation tool user interface having a feedback annotation element, in accordance with aspects herein.

As shown in FIG. 5, an evaluation criteria standards guide 322 may be presented with the evaluation tool user interface 300. The evaluation criteria standards guide 322 generally includes detailed information regarding evaluation criteria and requirements/suggestions for improving the application. In some aspects, a selectable indicator 320 may be presented, which upon a selection, causes the evaluation criteria standards guide 322 to be displayed. The evaluation criteria standards guide 322 may include one or more selectable evaluation criteria standards 330-332. As can be appreciated, the selectable evaluation criteria standards 330-332 correspond to a selected evaluation criteria, and/or a selected evaluation criteria category. For example, as shown in FIG. 5, the selectable evaluation criteria standards 330-332 relate to standards for evaluation criteria in the "navigation" evaluation criteria category. Further, as shown in FIG. 6, when an evaluation criteria standard is selected, the evaluation criteria standard may be displayed in the evaluation tool user interface 300. For example, the selected evaluation criteria standard may be displayed in feedback annotation element 324. Further, the selected evaluation criteria standard may be truncated to fit within feedback annotation element 324. Additionally, similar to the evaluation criteria, the selected evaluation criteria standard may be in stored association with a specific location or feature within the application user interface 380 and screen images/video of a rendered display of the evaluator device may be captured.

As shown in FIGS. 1-6, one or more standard display feature representations 302 may be presented. Display features may include elements associated with application user interface 380, such as a header, graphical control elements (discussed hereinabove in association with FIG. 2), selection user interfaces, sidebars, menus, and any other features associated with the application user interface 380. In one aspect, the standard display feature representations 302 provide a visual indication of a preferred layout of the application user interface 380. Accordingly, standard display feature representations 302 provide a means of assessing whether a given display within the application user interface 380 comports with a desired look and feel for the application user interface 380. In other aspects, display features of the application user interface may be automatically detected and compared with the standard display feature representations 302. The evaluation tool may automatically detect each display feature within application user interface 380, or specific display features, such as a header, for comparison with standard display feature representations 302. Further, display features that do not comply with the preferred layout may be highlighted by the evaluation tool to bring the features to the attention of the evaluator, and may be stored in association with an evaluation session.

Figure 7:
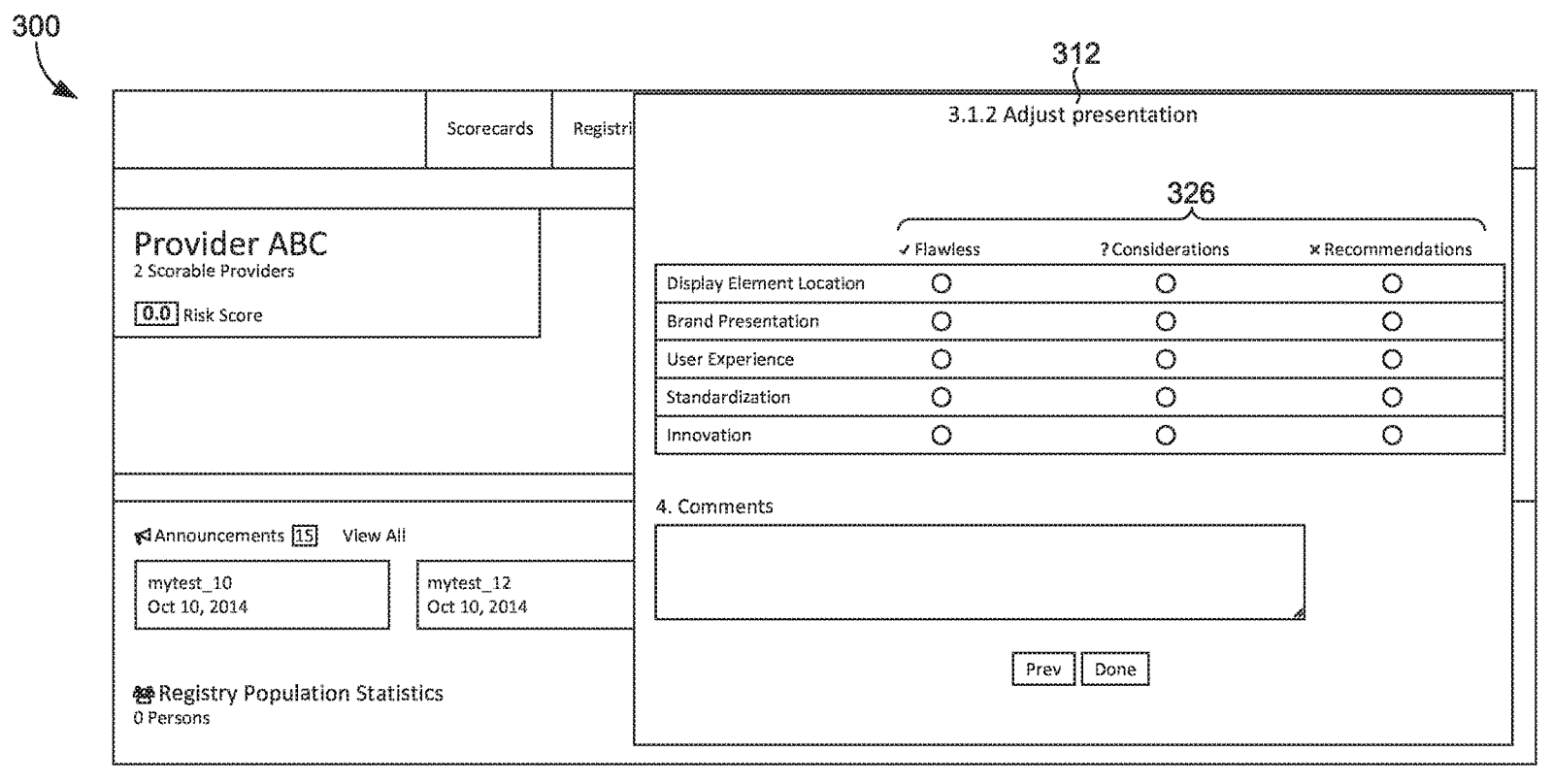

Additionally, as shown in FIG. 7, in some aspects, one or more selectable rankings 326 corresponding to a selected evaluation criteria 312 may be presented. The selectable rankings 326 provide a mechanism for providing a more detailed critique of the features of the application user interface 380 corresponding to selected evaluation criteria 312. The one or more rankings 326 may represent more specific or lower level aspects of the selected evaluation criteria 312. Further, as will be described in more detail below, the rankings may be used, in conjunction with selected evaluation criteria, to generate a metric or score that reflects the performance, design, and/or functionality of the application/application user interface 380.

As noted above, providing standardized criteria and preserving context of evaluations allows for improved review and analysis of numerous evaluation sessions. For example, an application performance score may be determined for each evaluation session and/or an aggregate application performance score may be determined for all evaluation sessions completed for an application. In one aspect, an application performance score may be based on received evaluation criteria and/or the rankings associated with an application. The determination of application performance scores may include an analysis of values and/or ratings associated with each evaluation criteria and ranking. The evaluation tool may also determine if the application performance score meets a predetermined application performance score threshold for the application.

In some aspects, reviews of evaluation sessions may be facilitated by extracting and packaging the various received, captured, and/or stored information associated with the evaluation sessions. In some aspects, each individual evaluation session may be packaged for a contextualized review. For example, a review of an evaluation session allows a reviewer to experience an evaluation session as a step-by-step walk-through of received evaluation criteria or as video playback of the evaluation session.

Figure 8:
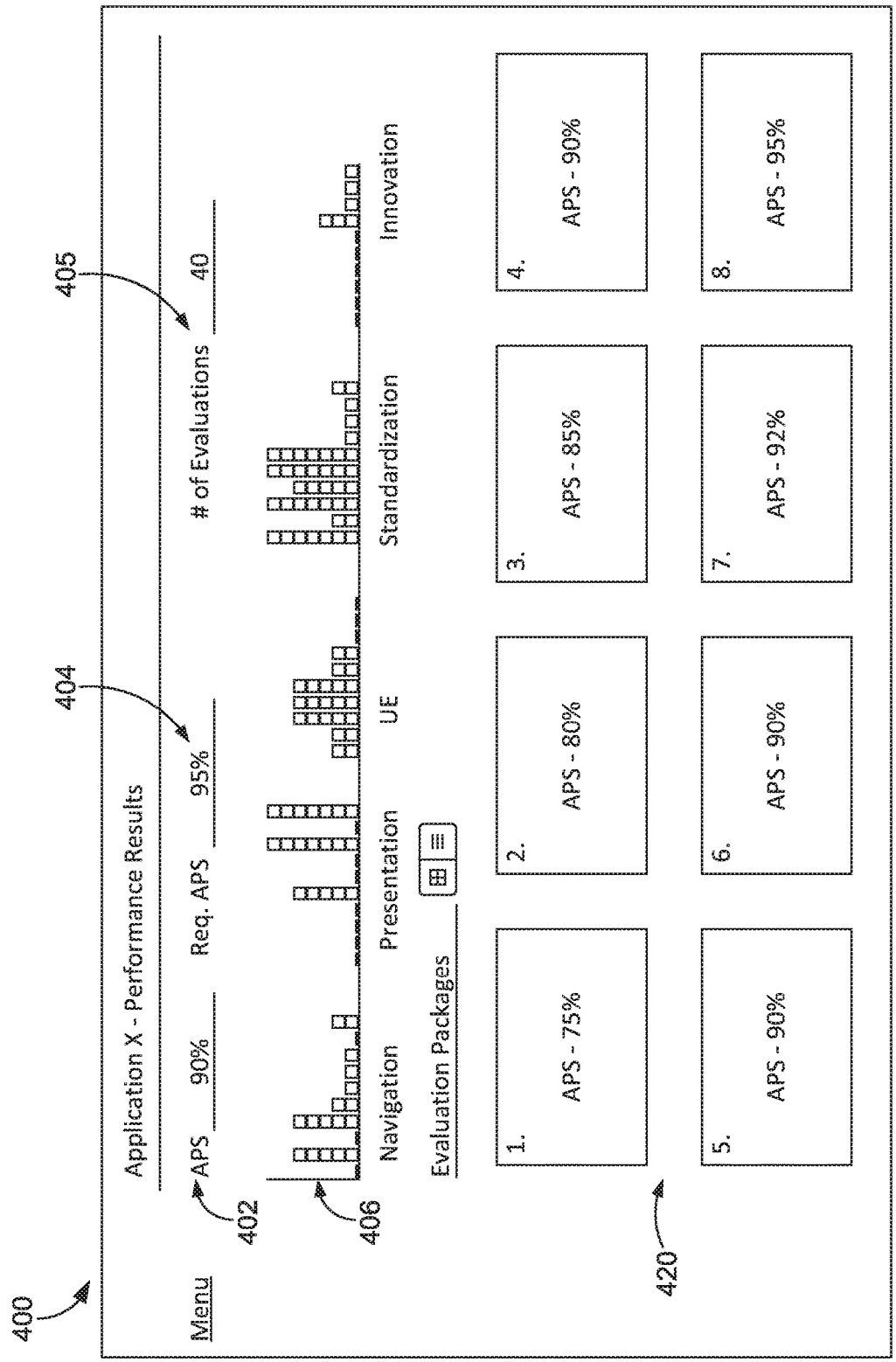
FIG. 8 is an illustrative depiction of an evaluation results user interface, in accordance with aspects herein.

As shown in FIG. 8, an evaluation results user interface 400 may be generated for displaying results of the evaluation sessions. Evaluation results user interface 400 may present aggregate performance score 402, required application performance score 404, and other information associated with the analysis of the completed evaluation sessions for a given application. Evaluation results user interface may include an indication of the number of completed evaluation sessions 405 for the application. Further, evaluation results user interface 400 may include an evaluation criteria overview 406, which provides a visual indication of ratings associated with evaluation criteria the completed evaluation sessions. As mentioned above, each evaluation session may be packaged a contextualized evaluation package. The contextualized evaluation packages 420 may include an indication of an application performance score associated with the evaluation session. Additionally, the contextualized evaluation packages 420 may be selectable, such that when selected, the reviewer may review the evaluation session associated with a selected contextualized evaluation package.

Figure 9:
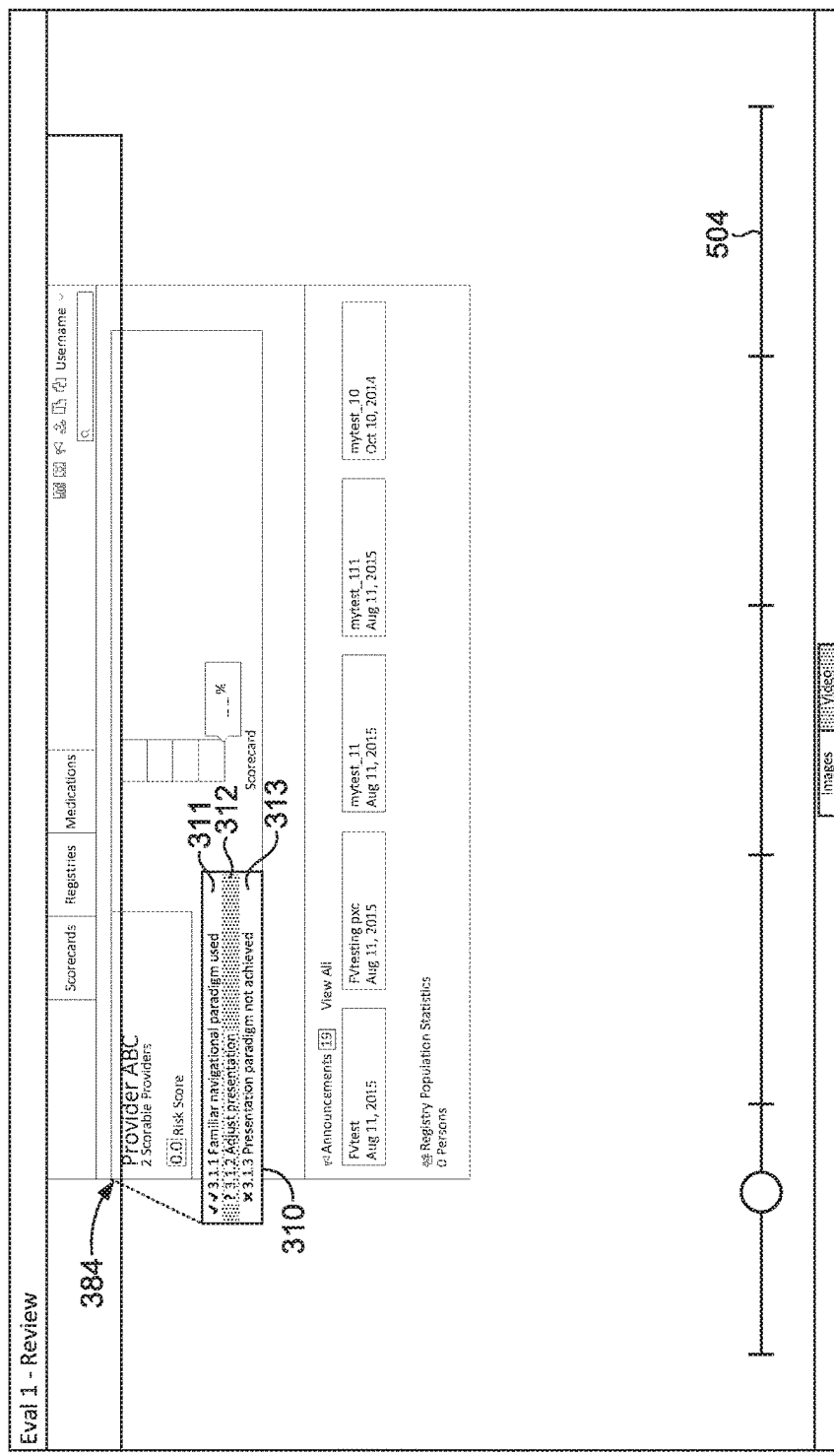
FIG. 9 is an illustrative depiction of an evaluation package review user interface, in accordance with aspects herein.

Additionally, as shown in FIG. 9, the evaluation tool may generate an evaluation package review user interface 500 for reviewing an evaluation session. In some aspects, selection of a given contextualized evaluation package (illustrated as 420 in FIG. 8) may cause presentation of the evaluation package review user interface 500. Evaluation package review user interface 500 may present each contextualized evaluation package in a number of ways/modes. For example, an evaluation session may be reviewed as a series of images corresponding to each evaluation criteria selected during the evaluation session, as a video of the evaluation session, or any number of other suitable review modes. The evaluation package review user interface 500 may include selectable review mode toggles 502, which allow a reviewer to switch between review modes. Further, the evaluation package review user interface 500 may include a review navigation control 504 that allows a user to scrub through or skip to a specific portion of an evaluation session. Accordingly, a reviewer may experience the evaluation session from the perspective of the evaluator, which allows the reviewer to see critiques as they were entered by the evaluator and features of the application/application user interface that correspond to the critiques.

Figure 10:
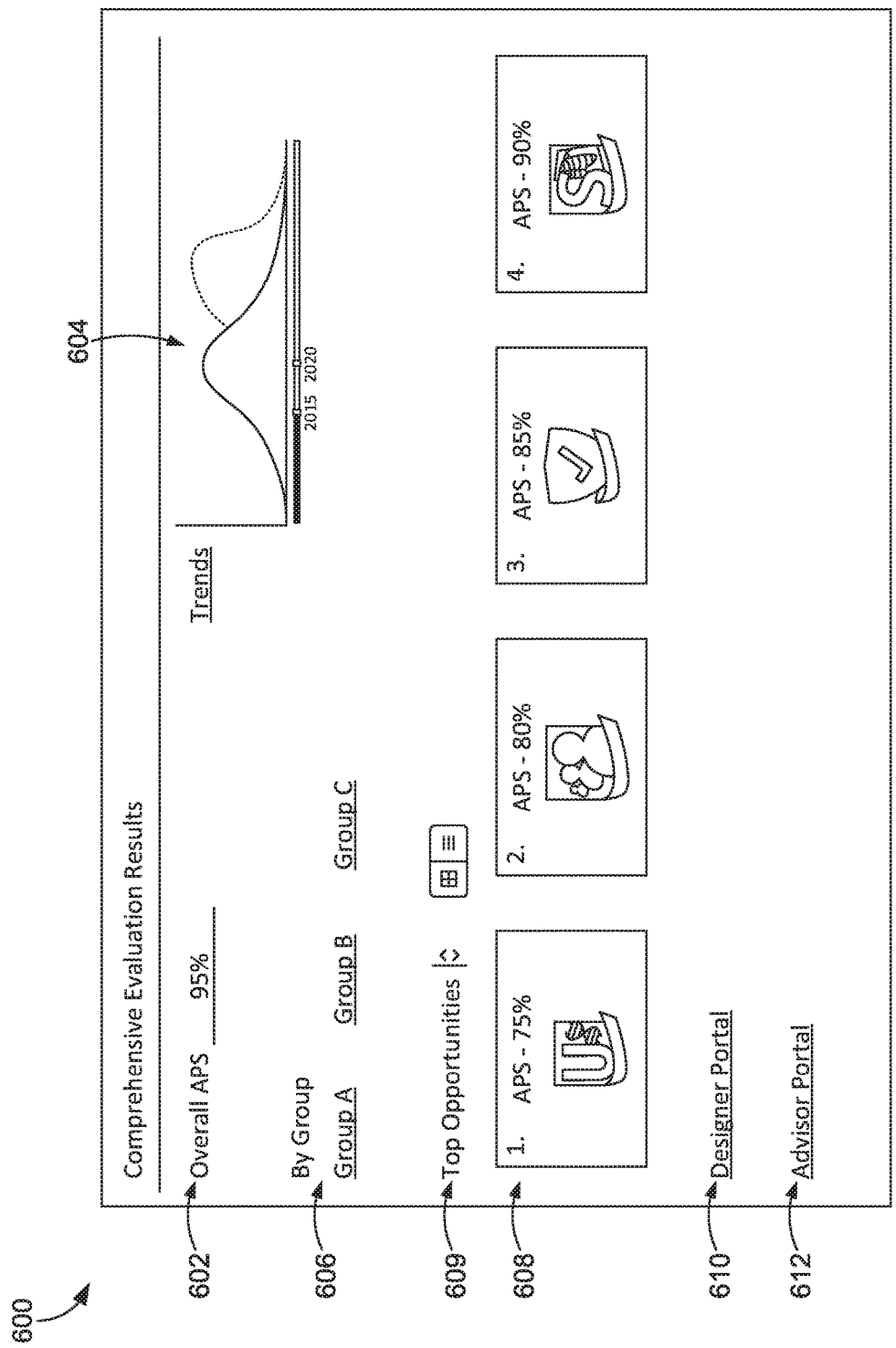
FIG. 10 is an illustrative depiction of a comprehensive evaluation results user interface, in accordance with aspects herein.

In another aspect, shown in FIG. 10, the evaluation tool may provide a comprehensive evaluation results user interface 600. The comprehensive evaluation results user interface 600 generally operates to provide access to the full scope of information collected by the evaluation tool. For example, the comprehensive evaluation results user interface 600 may include data associated with all applications employing the evaluation tool, information associated with particular users, trends associated with application performance, and any number of other aspects associated with evaluations. In one aspect, an overall application performance score 602 for all evaluated applications may be displayed. Additionally, application performance trends 604 may be presented to illustrate performance of applications over time based on completed evaluations.

Additionally, evaluation results may be organized by design groups 606, such that evaluation packages and metrics can be reviewed based on applications created by a common design group. For example, design group A may be responsible for designing and maintaining applications X, Y, and Z. By selecting Group A on the comprehensive evaluation results user interface 600, a reviewer may access completed evaluation sessions and associated analyses for applications X, Y, and Z.

Further, comprehensive evaluation results user interface 600 may provide access to review and performance information for a plurality of applications, which may be selected via application review portal 608. Application review portal 608 may display, for example, applications having low application performance scores, or "Top Opportunities" for improvement. Application review portal 608 may present applications based on a number of criteria, which are selectable via application review menu 609. For example, although "Top Opportunities" is shown as selected in FIG. 10, "Top Performers," "Most Improved," or any number of other criteria may be used to sort and present applications in application review portal 608.

Additionally, information relating to specific designers of applications may be generated and accessed via designer portal 610. Although the term designers is used, designer portal 610 generally provides access to users who create, program, maintain, or are responsible for other aspects of the performance or functionality of an application. For example, trends relating to evaluation criteria/performance scores for applications designed by a designer may be compared to evaluation criteria or performance scores across all applications. Additionally, designer portal 610 may provide access to the evaluation tool, such that designers may perform a self-evaluation of applications which they design. In one aspect, this provides a mechanism for designers to pre-screen an application prior to the application being evaluated by other evaluators. This allows the designer to assess their own solution using the objective and standardized criteria provided by the evaluation tool.

Advisor portal 612 may provide access to data, trends, and settings across designer groups, all applications, and/or specific evaluators. Advisor portal 612 may provide access to executive, managerial, or other users, in order to establish settings and view information not otherwise available via the other user interfaces/portals described herein. For example, advisor portal 612 may be generally responsible for presenting tendencies or trends for a given designer. Additionally, trends relating to a specific evaluator may be detected and displayed. For example, if a particular evaluator has demonstrated a trend of scoring applications lower than other evaluators, this trend may be identified and presented via advisor portal 612. Further, advisor portal 612 may be configured to allow access to a comprehensive analysis across all evaluation tool data and/or results for all applications. Additionally, key evaluation criteria may be identified by the comprehensive analysis, which can be used to tailor specific evaluation criteria. Further, settings related to weighting of evaluation criteria and/or rankings may be modified using advisor portal 612. Additionally, threshold or required application performance scores may be customized using advisor portal 612.

Figure 11:
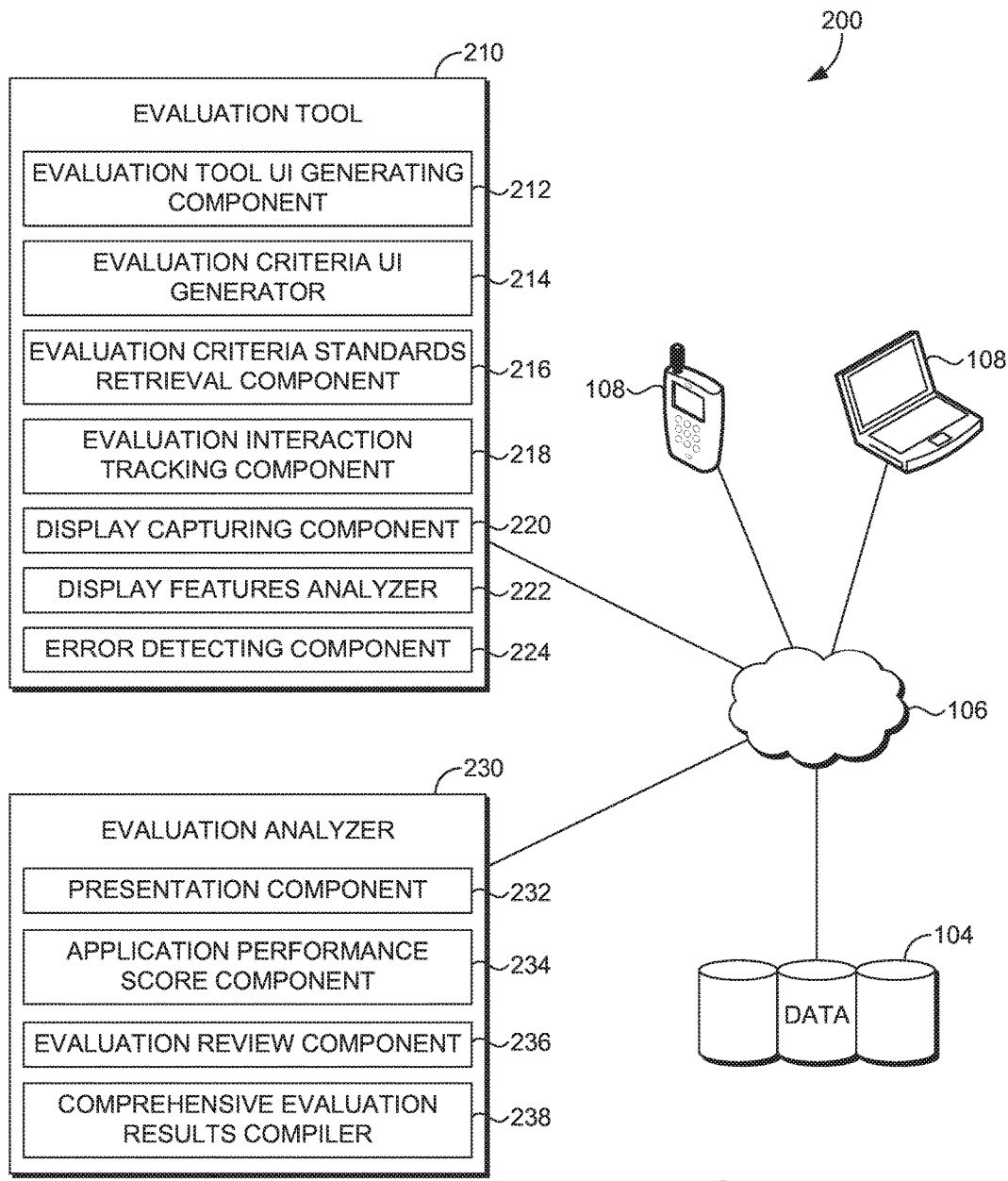
FIG. 11 is a block diagram illustrating an exemplary system in which some embodiments of the present invention may be employed.

With reference to FIG. 11, a block diagram is presented that shows an exemplary architecture for computing system 200, which in one aspect, may be employed to provide an evaluation tool 210. It will be appreciated that the computing system architecture 200 shown in FIG. 11 is merely an example of one suitable computing system and is not intended as having any dependency or requirement related to any single module/component or combination of modules/components. The system architecture depicted in FIG. 11 is provided as one example of any number of suitable computer architectures, such as computing architectures that support local, distributed, or cloud-based software platforms, and is suitable for supporting computing system 200.

The exemplary system depicted in FIG. 11 illustrates one embodiment of the present disclosure. System 200 may be utilized to provide an evaluation tool 210 for assessing usability, functionality, and/or design of an application. In some aspects, evaluation tool 210 may comprise: an evaluation tool user interface generating component 212; an evaluation criteria user interface generator 214; an evaluation interaction tracking component 218; and a display capturing component 220, among other components which will be described in more detail below. In some aspects, evaluation tool 210 may be embedded in a framework of a browser, such that an evaluation tool user interface may be presented and accessed via the same container as the application. In other aspects, the evaluation tool 210 may be implemented within an operating system or operating platform of a computing device. As such, the evaluation tool 210 may be employed to provide an evaluation of functionality, performance, and/or design of virtually any computer application, program, or solution. Some aspects of system 200 will be described herein with reference to FIGS. 1-10, discussed hereinabove, which provide exemplary representations of various interfaces and displays generated by system 200.

Evaluation tool user interface generating component 212 may be generally configured for generating an evaluation tool user interface 300 (shown in FIGS. 1-7) and displaying the evaluation tool user interface 300 simultaneously with an application user interface 380 (shown in FIGS. 1-7). In some aspects, evaluation tool user interface generating component 212 may generate and present evaluation tool user interface 300 as a semi-transparent overlay interface, such that the application user interface 380 may be accessed during an evaluation session, while the evaluation tool 210 is operational. As can be appreciated, in other aspects, evaluation tool user interface generating component 212 may generate and present evaluation tool user interface 300 as an opaque, or fully-transparent overlay. In some aspects, the evaluation tool user interface generating component 212 may generate and present one or more standard display feature representations 302 (shown in FIGS. 1-7). Standard display feature representations 302 generally operate to provide a visual indication of a standardized display features layout of the application user interface 380. In one aspect, this provides a means of assessing whether a given display within the application user interface 380 comports with a desired look and feel for the application user interface 380.

In addition to application user interface 380 being unobscured by evaluation tool user interface 300, evaluation tool user interface generating component 212 may generate and present interfaces such that functionalities of application user interface 380 remain accessible during an evaluation session. Accordingly, because evaluation tool 210 allows the user to interact with the application user interface 380 and the evaluation tool user interface 300, the evaluation tool 210 may be used to assess live interactions with the application user interface 380, including displaying transitions and navigation from one screen to another. This is one example of how evaluation tool 210 facilitates preservation of the context of the evaluation session and application user interface 380.

Evaluation criteria user interface generator 214 may generally be configured for generating an evaluation criteria user interface 310 (shown in FIGS. 1-6) having one or more evaluation criteria 311-313 (shown in FIGS. 1-6). Evaluation criteria user interface generator 214 may also be configured to generate evaluation criteria having an associated a rating that represents a quality of a feature of the application user interface, and be configured to receive a user selection of at least one selectable evaluation criteria of the one or more selectable evaluation criteria. The evaluation criteria 311-313 may be presented as a drop-down, or any other type of interface suitable for presenting evaluation criteria for selection. In some aspects, evaluation criteria user interface generator 214 may be configured to display the evaluation criteria user interface 310 upon receiving an evaluator selection of a feature of the application user interface 380, on a display of an evaluator device at a location corresponding to the received evaluator selection. Evaluation tool user interface generating component 214 may generate and present (as shown in FIG. 3) evaluation criteria user interface 310 at a specific location 384 within application user interface 380 at a location corresponding to the received evaluator selection. In other aspects, evaluation tool user interface generating component 214 may generate and present evaluation criteria user interface 310 at a predetermined location (e.g., as shown in FIG. 3, although it should be appreciated that any other suitable location may be used).

In additional aspects, evaluation tool user interface generating component 214 may generate and present an evaluation criteria user interface that is configured to receive feedback, such as textual annotations, recorded audio, or any other type of evaluator feedback. In this aspect, the evaluation tool user interface generating component 214 may generate and present a user interface that provides a means for an evaluator to enter free-form critiques, feedback and/or comments. Further, evaluation criteria user interface generator 214 may generate and display an evaluation criteria categories menu 314. Evaluation criteria categories menu 314 allows for selection of an evaluation criteria category. Further, evaluation criteria user interface generator 214 may generate and display one or more selectable evaluation criteria 311-313 that correspond to the selected evaluation criteria category.

Additionally, evaluation criteria user interface generator 214 may be configured to display one or more selectable rankings 326 (shown in FIG. 7) corresponding to a selected evaluation criteria. The selectable rankings 326 provide a mechanism for providing a more detailed critique of the features of the application user interface 380 corresponding to selected evaluation criteria. The rankings may be used, in conjunction with selected evaluation criteria, to generate a metric or score that reflects the performance, design, and/or functionality of the application/application user interface 380.

In additional aspects herein, evaluation tool 210 may include an evaluation criteria standards retrieval component 216 for retrieving an evaluation criteria standards guide. The evaluation criteria standards guide may include detailed information regarding evaluation criteria and requirements for meeting standards.

Evaluation interaction tracking component 218 may be generally responsible for receiving and storing interactions during evaluation sessions. In one aspect, evaluation interaction tracking component 218 is configured for recording a user selection of the at least one evaluation criteria in association with the at least one feature of the application user interface. For example, evaluation interaction tracking component 218 may be configured to store the selection of evaluation criteria/feedback with an indication of a location or identifier of associated features of the application, a corresponding time/order of the interactions. In some aspects, the evaluation interaction tracking component 218 may be configured to begin tracking interactions upon detecting one or more evaluator interactions with the evaluation tool user interface 300. As a result, evaluation interaction tracking component 218 tracks the display of the application user interface 380 and the evaluation tool user interface 300 in association with one another, such that the context of the evaluation session may be maintained for later analysis and/or viewing.

Display capturing component 220 may be generally configured for capturing one or more screen images during an evaluation session. In one aspect, display capturing component 220 may be configured for capturing one or more screen images corresponding to a currently rendered display of the user device, wherein the one or more screen images include an image depicting the user selection of the at least one evaluation criteria. Display capturing component 220 may be configured to capture a variety of types of screen images. For example, in some aspects, the display capturing component 220 captures, in real time, the one or more screen images as the one or more screen images appear on an evaluator device. As a result, the display capturing component 220 may capture one or more screen images in a way that preserves the context of the rendered display of the application user interface 380 and interactions with the evaluation tool 210 during a given evaluation session. Preserving the context of the rendered display, as presented on an evaluator device, allows the system to be effectively implemented across a variety of device types. For example, one evaluator device may be a mobile device that renders the application user interface 380 differently than another evaluator device, such as a laptop, tablet, or PC.

Additionally, the one or more screen images captured by the display capturing component 220 may comprise a video. For example, the video may record a live transition between rendered displays when a graphical control element of application user interface 380 is selected. Further, in additional aspects, the display capturing component 220 may be configured to begin capturing the one or more screen images upon receiving an indication that a selection of a criteria, or other type of user interaction with evaluation tool user interface 300, has been received.

Additionally, the system may include a display feature analyzer 222 for identifying one or more display features within the application user interface 380 and determining whether the one or more display features conform to a standard display feature layout. In one aspect, display feature analyzer 222 may automatically detect display features within the application user interface and determine if the display features conform to the standard display features layout. Display features may include, in a non-limiting example: elements included in a page display layout, selectable icons, command buttons, data input fields, and/or output fields for displaying objects within the application user interface. The standardized display features layout may be predetermined based on the application being evaluated. For example, a given entity that produces applications may set a standardized display features layout that reflects a desired/consistent layout all applications produced by the entity.

In other aspects, the display feature analyzer 222 may be configured to determine whether each display feature within the application user interface is a standard display feature. A plurality of standard display features may be stored, for example, in a standard display feature library. In some aspects, the display feature analyzer 222 may access the standard display feature library to determine whether a display feature is a standard display feature. Further, the display feature analyzer 222 may be configured to determine whether the application user interface meets a minimum threshold of standard display features. The minimum threshold may be determined and/or set based on any number of considerations. In one aspect, the minimum threshold standard display features represent a number, ratio, or other quantification that represents the minimum proportion of standard display features required to maintain a consistent look and feel for the application user interface, as compared to other applications produced by a provider of the application.

Further, the system may include an error detecting component 224 configured to initiate error logging upon detecting a failure of graphical control elements to execute and/or a rendering error associated with display features and/or content by application user interface 380. The error detecting component 224 may have access to, for example, an activity log that provides an identification of a source of the error. Further, error detecting component 224 may provide an indication of the source of an error to the evaluation interaction tracking component 218 to be stored in association with a given evaluation session in which the error occurred. Further, display capturing component 220 may be configured to capture one or more images depicting the error.

In some embodiments, system 200 includes an evaluation analyzer 230. Evaluation analyzer 230 generally operates to perform an analysis of information associated with evaluation sessions and to facilitate contextualized reviews of evaluation sessions. The evaluation analyzer 230 may have access to a plurality of evaluation sessions, for example, via network 106 (shown in FIG. 14), stored in data clusters 104 (shown in FIG. 14). In one aspect, evaluation analyzer 230 includes a presentation component 232 that facilitates presentation of the various interfaces and displays associated with evaluation analyzer 230.

In some aspects, evaluation analyzer 230 may include an application performance score component 234, which may generally operate to perform an analysis of evaluation session information to determine an application performance score for an application. In one aspect, an application performance score may be based on received evaluation criteria and/or rankings associated with an application. Application performance score component 234 may also be responsible for assigning or accounting for a weighted value for each evaluation criteria and associated rankings. For example, evaluation criteria associated with navigation may be weighted more heavily than evaluation criteria associated with presentation. As can be appreciated, different evaluation criteria may be assigned different weights depending on the type of application and/or desired objectives for a given application. An application performance score may be represented by a percentage, a numeric scale, a letter grade, or any other suitable means of assigning a value to the results of an evaluation session based on received evaluation criteria and/or rankings.

Application performance score component 234 may also be responsible for determining if the application performance score meets a predetermined application performance score threshold. The application performance score threshold may be set based on any number of factors, such as urgency of deployment of the application and/or whether the application is already in use, among others. Additionally, the application performance score threshold may be predetermined by a provider of the application. In some aspects, if the application does not meet the threshold, the application is not deployed in a live setting. As can be appreciated, an application performance score may be determined for each evaluation session based on the evaluation criteria and/or rankings received during the session. Additionally, an aggregate performance score that represents a score for the application based on a plurality of received evaluations of the application may be generated by application performance score component 234. The aggregate performance score may provide an indication of a mean, median, or other representation of multiple evaluations performed by any number of evaluators. Further, in some aspects, an aggregate performance score may exclude and/or identify individual application performance score outliers that would statistically skew the aggregate performance score.

In some aspects, the evaluation analyzer 230 includes an evaluation review component 236 for compiling and generating for presentation results associated with completed evaluation sessions. For example, evaluation review component 236 may be configured to generate an evaluation results user interface having one or more application performance scores and one or more selectable contextualized evaluation packages. Accordingly, the evaluation review component 236 may extract and package the various received, captured, and/or stored information associated with an evaluation session, and corresponding application performance scores. Presentation may be facilitated, for example, using presentation component 232. As discussed hereinabove, evaluation review component 236 may generate for presentation an evaluation results user interface 400 (e.g., as shown in FIG. 8), which may include aggregate performance score 402 (e.g., as shown in FIG. 8), required application performance score 404 (e.g., as shown in FIG. 8), and other information associated with the analysis performed by application performance score component 234, or other components of system 200. The evaluation review component 236 may also operate to package the evaluation information for completed evaluation sessions as contextualized evaluation packages 420 (e.g., as shown in FIG. 8). The evaluation packages may be selectable, such that the selection of a given evaluation package causes an evaluation package review user interface 500 (e.g., as shown in FIG. 9) to be displayed. In one aspect, one or more selectable contextualized evaluation packages comprise the one or more screen images captured by display capturing component 220. Further, evaluation review component 236 may generate for presentation an evaluation criteria overview 406 (e.g., as shown in FIG. 8), which provides a visual indication of ratings, trends, and other information associated with evaluation criteria the completed evaluation sessions.

Additionally, evaluation review component 236 may generate for presentation an evaluation package review user interface 500 (e.g., as shown in FIG. 9), for reviewing an evaluation session. Evaluation review component 236 may facilitate presentation of contextualized evaluation packages in a number of ways/modes. For example, an evaluation session may be reviewed as a series of images corresponding to each evaluation criteria selected during the evaluation session, as a video of the evaluation session, or any number of other suitable review modes. Evaluation review component 236 may operate to generate selectable review mode toggles 502 (e.g., as shown in FIG. 9), which allow a reviewer to switch between review modes. Further, the evaluation review component 236 may operate to generate a review navigation control 504 (e.g., as shown in FIG. 9), that allows a reviewer to scrub through or skip to a specific portion of a completed evaluation session. Accordingly, a reviewer may experience the evaluation session from the perspective of the evaluator, which allows the reviewer to see critiques as they were entered by the evaluator and features of the application/application user interface that correspond to the critiques.

Additionally, evaluation analyzer 230 may comprise a comprehensive evaluation results compiler 238 for generating and/or displaying a user interface that provides access to the full scope of information collected by the evaluation tool. For example, comprehensive evaluation results compiler 238 may generate for presentation a comprehensive evaluation results user interface 600 (e.g. as shown in FIG. 10) which may include data associated with all applications employing the evaluation tool, information associated with particular users, trends associated with application performance, and any number of other aspects associated with evaluations. In one aspect, comprehensive evaluation results compiler 238 may facilitate presentation of an overall application performance score for all applications that have been evaluated. Further, comprehensive evaluation results compiler 238 may facilitate determining and presenting application performance trends which illustrate performance of applications over time based on completed evaluations.

Further, comprehensive evaluation results compiler 238 may compile and facilitate presentation of evaluation results for a plurality of applications. For example, comprehensive evaluation results compiler 238 may generate evaluation results by design group, such that evaluation packages and metrics can be reviewed based on applications created by a common design group. For example, design group A may be responsible for designing and maintaining applications X, Y, and Z. By selecting Group A on the comprehensive evaluation results user interface 600, a reviewer may access completed evaluation sessions and associated analyses for applications X, Y, and Z, compiled by comprehensive evaluation results compiler 238.

Additionally, comprehensive evaluation results compiler 238 may generate review and performance information for a plurality of applications, which may be presented, for example, via application review portal 608 (e.g., as shown in FIG. 10). Comprehensive evaluation results compiler 238 may compile and present applications (and associated information/results) based on a number of criteria, which may be selectable via an application review menu 609 (e.g., as shown in FIG. 10). For example, comprehensive evaluation results compiler 238 may determine and display applications having low application performance scores, or "Top Opportunities" for improvement. Any number of other categories, criteria, or other groupings may be used to sort and present applications.

In additional aspects, comprehensive evaluation results compiler 238 determine and facilitate access to data, trends, and settings across designer groups, all applications, and/or specific evaluators. In one aspect, comprehensive evaluation results compiler 238 operates to determine information relating to specific designers of applications, which may be generated and accessed via designer portal 610 (e.g., as shown in FIG. 10). Although the term designers is used, designer portal 610 generally provides access to users who create, program, maintain, or are responsible for other aspects of the performance or functionality of an application. For example, trends relating to evaluation criteria/performance scores for applications designed by a designer may be compared to evaluation criteria or performance scores across all applications by comprehensive evaluation results compiler 238. Additionally, comprehensive evaluation results compiler 238 may provide access (e.g., via designer portal 610) to evaluation tool 210, such that designers may perform a self-evaluation of applications which they design. In one aspect, this provides a mechanism for designers to prescreen an application prior to the application being evaluated by other evaluators.

In some aspects, comprehensive evaluation results compiler 238 may employ advisor portal 612 (e.g., as shown in FIG. 10) for presenting tendencies or trends for a given designer. Additionally, trends relating to a specific evaluator may be detected and displayed. For example, if a particular evaluator has demonstrated a trend of scoring applications lower than other evaluators, this trend may be identified by comprehensive evaluation results compiler 238 and presented via advisor portal 612.

The comprehensive evaluation results compiler 238 may use results identified by application performance score component 234, and any other components of system 200 to perform the comprehensive analysis. Additionally, key evaluation criteria may be identified by the comprehensive analysis, which can be used to tailor specific evaluation criteria and corresponding criteria. Further, comprehensive evaluation results compiler 238 may provide access to executive, managerial, or other users, in order to establish settings and view information not otherwise available via the other user interfaces/portals described herein. For example, comprehensive evaluation results compiler 238 may provide a mechanism for modifying settings related to weighting of evaluation criteria/rankings and standard display features layouts. Additionally, in some aspects, comprehensive evaluation results compiler 238 may facilitate setting a threshold or required application performance score for a given application.

Figure 12:
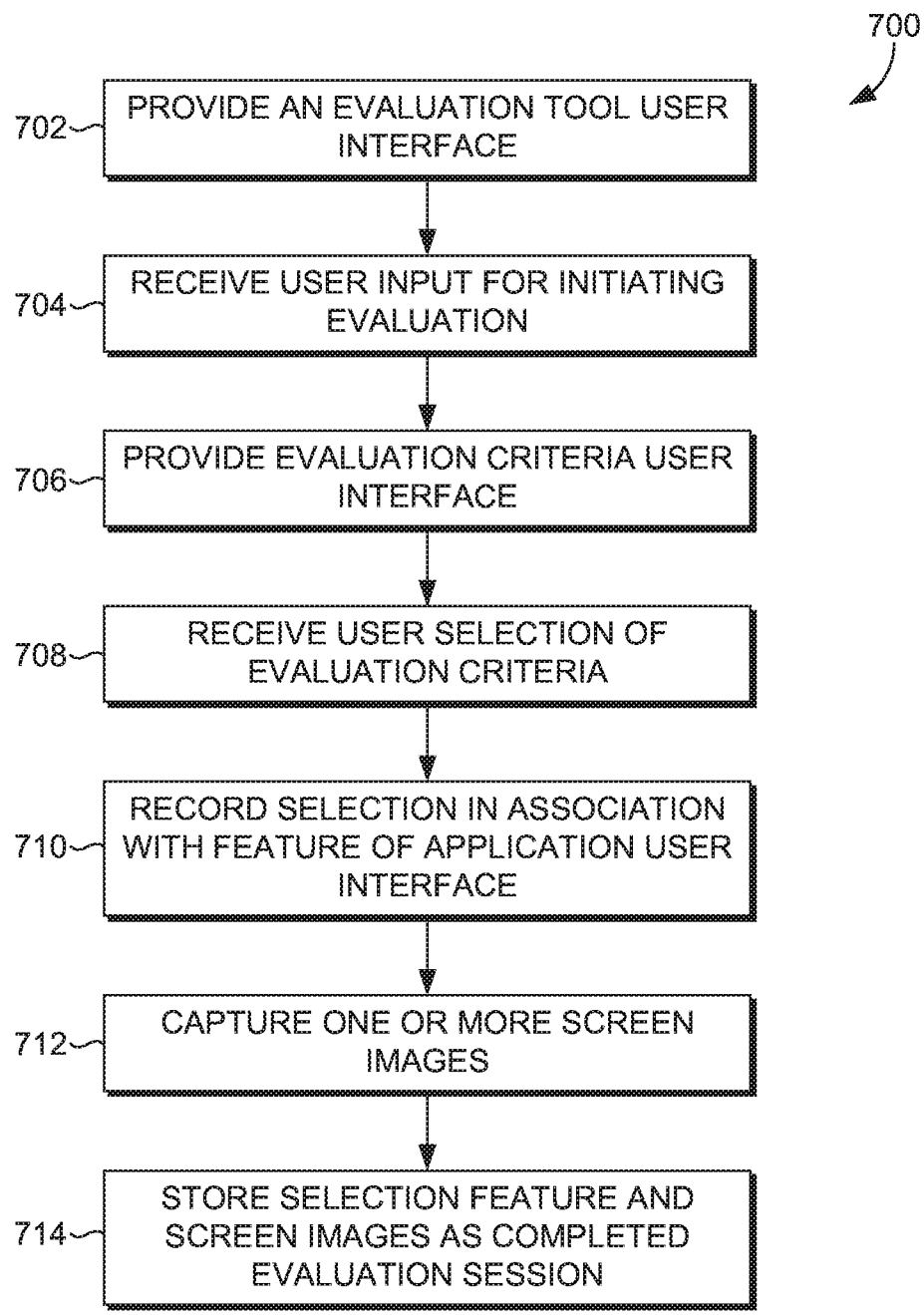
FIG. 12 is a flow diagram illustrating a method for providing an evaluation tool, in accordance with aspects herein.

In another embodiment, a method 700 for implementing an evaluation tool for providing an evaluation of an application is provided. Turning now to FIG. 12, a flow diagram is provided for illustrating an exemplary process of executing the method 700. As shown at block 702, the method may include providing an evaluation tool user interface simultaneously with an application user interface, wherein the evaluation tool user interface in a semitransparent overlay interface. In some aspects, the evaluation tool may be embedded in a framework of a browser, such that the evaluation tool user interface is presented and accessed via the same container as the application. In other aspects, the evaluation tool may be implemented within an operating system or the platform of a computing device, such as a computing device of a user and/or a designer. Additionally, the evaluation tool may be presented as a transparent overlay interface of the application. As can be appreciated, in other aspects, the evaluation tool user interface may be presented as an opaque or semi-transparent overlay. The evaluation tool user interface may include one or more standard display feature representations. Standard display feature representations generally operate to provide an indication of locations at which display features within the application should be displayed. In one aspect, this provides a means of assessing whether a given display within the application comports with a desired look and feel for the application.

As shown at block 704, the method may include receiving a user input for initiating an evaluation of at least one feature of the application user interface. In some aspects, the user input is received on a display evaluator/user device at a specific location within an application user interface where an evaluator intends to provide evaluation input, such as feedback for evaluation criteria.

As shown at block 706, the method may further comprise providing an evaluation criteria user interface for displaying one or more selectable evaluation criteria. The one or more selectable evaluation criteria may be presented upon receiving the user input. In some aspects, the evaluation criteria user interface is presented on a display of the user device at a location corresponding to the received user selection. In further aspects, each selectable evaluation criteria of the one or more selectable evaluation criteria has an associated a rating that represents a quality of a feature of the application user interface. Evaluation criteria user interface may be a drop-down, or any other type of interface suitable for presenting evaluation criteria for selection. As briefly discussed above, the evaluation criteria are standardized criteria for evaluating features of the application and/or application user interface. Further, each evaluation criteria may have a corresponding value or rating that represents a quality of a feature of the application. For example, evaluation criteria may relate to "presentation" and may represent: a flawless rating; an intermediate rating; and/or an unsatisfactory rating. It should be appreciated that any number of evaluation criteria may be presented. Additionally, in some aspects, evaluation criteria user interface may be configured to receive feedback, such as textual annotations, recorded audio, or any other type of evaluator feedback. In this aspect, evaluation criteria user interface provides a means for an evaluator to enter free-form critiques and comments.

Further, as shown at block 708, the method may include receiving a user selection of at least one selectable evaluation criteria of the one or more selectable evaluation criteria. The received user selection may correspond to a quality or an assessment of a feature of the application/application user interface.

At block 710 the method may comprise recording the user selection of the at least one evaluation criteria in association with the at least one feature of the application user interface. For example, the user selection of the at least one evaluation criteria may be stored with an indication of a location or identifier of associated features of the application, a corresponding time/order of the interactions. In some aspects, the method may include tracking interactions upon detecting one or more evaluator interactions with the evaluation tool user interface.

Further, as shown at block 712, the method may include capturing one or more screen images corresponding to the currently rendered display of the user device, wherein the one or more screen images include an image depicting the user selection of the at least one evaluation criteria. A variety of types of screen images may be captured. For example, in some aspects, the one or more screen images are captured in real time, as the one or more screen images appear on an evaluator device. Accordingly, the one or more screen images may comprise a video of at least a portion of an evaluation session. As a result, the one or more screen images may be captured in a way that preserves the context of the rendered display of the application user interface and interactions with the evaluation tool during a given evaluation session. Further, preserving the context of the rendered display, as presented on an evaluator device, allows the system to be effectively implemented across a variety of device types.

As shown at block 714, the method may comprise storing the at least one selected evaluation criteria, the at least one feature of the application user interface, and the one or more screen images as a completed evaluation session. Accordingly, completed evaluation sessions include details of user selections inputs, evaluation criteria, and/or images from evaluation sessions that preserve context of the sessions for later review/analysis.

Figure 13:
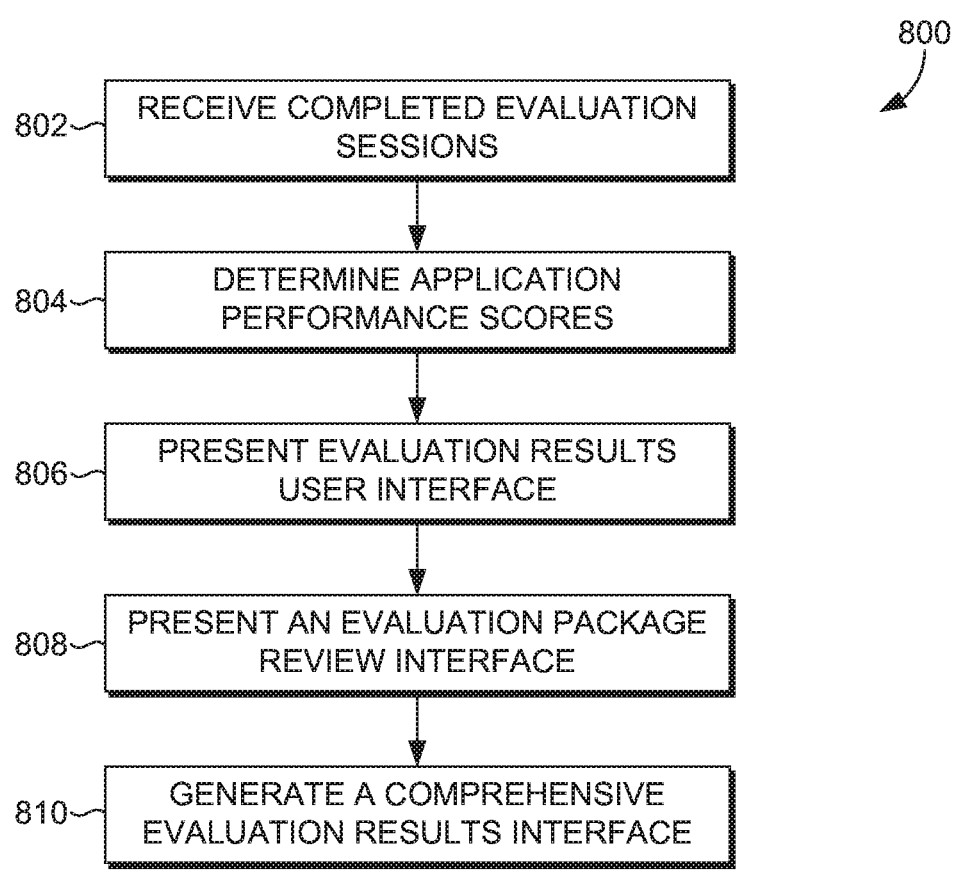
FIG. 13 is a flow diagram illustrating a method for generating one or more evaluation tool and evaluation results user interfaces, in accordance with aspects herein.

As shown in FIG. 13, another embodiment herein provides one or more computer storage media devices having computer-executable instructions embodied thereon for performing a method 800 for implementing an evaluation tool to facilitate an evaluation of an application. Generally speaking, the method provides a mechanism for reviewing results associated with evaluation sessions completed using the evaluation tool, as described herein. As shown at block 802, the method may include receiving and storing one or more completed evaluation sessions for a first application. The one or more completed evaluation sessions may comprise: at least one selected evaluation criteria corresponding to at least one feature of the application user interface; and one or more screen images including an image depicting a user selection of the at least one evaluation criteria. In some aspects, the method includes receiving one or more completed evaluation sessions for a second application.

As shown at block 804, the method may include determining an application performance score for each completed evaluation session of the one or more completed evaluation sessions. In some aspects, the application performance score is determined based on one or more ratings associated with the at least one selected evaluation criteria and comprises a value representing quality of the application. Additionally, an aggregate application performance score for the application, and a required aggregate application performance score for the application.

As shown at block 806, the method may include presenting an evaluation results user interface for displaying the application performance score for the completed evaluation sessions. Further, the method may comprise presenting, via the evaluation results interface, at least one contextualized evaluation package corresponding to the completed evaluation session. In some aspects, the at least one contextualized evaluation package includes the one or more screen images associated with the one or more evaluation sessions. In some aspects, the method includes presenting a contextualized evaluation package for each completed evaluation session. The evaluation packages may be selectable, such that the selection of a given evaluation package causes an evaluation package review user interface to be displayed, as described below.

Additionally, as illustrated at block 808, the method may include presenting an evaluation package review interface having a review navigation control that allows a reviewer to navigate the one or more screen images. The evaluation package review user interface may present each contextualized evaluation package in a number of ways/modes. For example, an evaluation session may be reviewed as a series of images, as a live walk-through of each selected criteria, or as a video of the evaluation session. The review interface may include selectable review mode toggles, which allow a user to switch between review modes. Further, the review interface may include a review navigation control that allows a user to scrub through or skip to a specific portion of an evaluation session.

Additionally, at block 810, the method further comprises presenting a comprehensive evaluation results interface including evaluation results corresponding to completed evaluation sessions for the first application and the second application. The comprehensive evaluation results user interface may provide information relating to any number of applications, information associated with a particular user, and information associated with a given evaluator. In one aspect, an overall application performance score for all applications, and a focused criteria reflecting an criteria determined to require improvement, may be displayed. Additionally, evaluation results may be organized by design groups, such that evaluation packages and metrics can be reviewed based on applications constructed by a common design group. Further, evaluation results for a plurality of applications may be accessed via an application review portal. In some aspects, information relating to specific designers of applications may be generated and accessed via a designer portal. For example, trends relating to evaluation criteria/performance scores for applications designed by a designer may be compared to evaluation criteria or performance scores across all applications. Additionally, the designer portal may provide access to an evaluation tool, such that designers may perform a self-evaluation of applications which they design. In one aspect, an advisor portal may provide access to data, trends, and settings across designer groups, all applications, and/or specific evaluators. For example, the advisor portal may be generally responsible for presenting tendencies or trends for a given designer. Additionally, trends relating to a specific evaluator may be detected and displayed. For example, if a particular evaluator has demonstrated a trend of scoring applications lower than other evaluators, this trend may be identified and presented via the advisor portal. Further, the advisor portal may be configured to allow access to a comprehensive analysis across all evaluation tool data and/or results for all applications. Further, settings related to weighting of criteria/evaluation criteria may be modified using the advisor portal.

In additional aspects, each of the embodiments described herein may be implemented in an existing or currently implemented application. For example, an existing application may be reviewed over time by any number of reviewers, using the embodiments described herein, in order to improve and/or assess performance of an application.

Some aspects of the present invention may be described in the general context of computer-executable instructions, such as program modules, being executed by a computer. Generally, program modules include, but are not limited to, routines, programs, objects, components, and data structures that perform particular tasks or implement particular abstract data types. The present invention may also be practiced in distributed computing environments where tasks are performed by remote processing devices that are linked through a communications network. In a distributed computing environment, program modules may be located in local and/or remote computer storage media including, by way of example only, memory storage devices.

As one skilled in the art will appreciate, embodiments of the present invention may be embodied as, among other things: a method, system, or set of instructions embodied on one or more computer-readable media. Accordingly, the embodiments may take the form of a hardware embodiment, a software embodiment, or an embodiment combining software and hardware. In one embodiment, the invention takes the form of a computer-program product that includes computer-usable instructions embodied on one or more computer-readable media devices.

Computer-readable media include both volatile and nonvolatile media, removable and non-removable media, and contemplate media readable by a database, a switch, and various other network devices. By way of example, and not limitation, computer-readable media comprise media implemented in any method or technology for storing information, including computer storage media and communication media. Examples of stored information include computer-useable instructions, data structures, program modules, and other data representations. Computer storage media examples include, but are not limited to, information-delivery media, RAM, ROM, EEPROM, flash memory or other memory technology, CD-ROM, digital versatile discs (DVDs), holographic media or other optical disc storage, magnetic cassettes, magnetic tape, magnetic disk storage, other magnetic storage devices, and other computer hardware or storage devices. These technologies can store data momentarily, temporarily, or permanently.

The present invention may be operational with numerous other general purpose or special purpose computing system environments or configurations. Examples of well-known computing systems, environments, and/or configurations that may be suitable for use with the present invention include, by way of example only, personal computers, server computers, handheld or laptop devices, multiprocessor systems, microprocessor-based systems, set top boxes, programmable consumer electronics, network PCs, minicomputers, mainframe computers, distributed computing environments that include any of the above-mentioned systems or devices, and the like.

Figure 14:
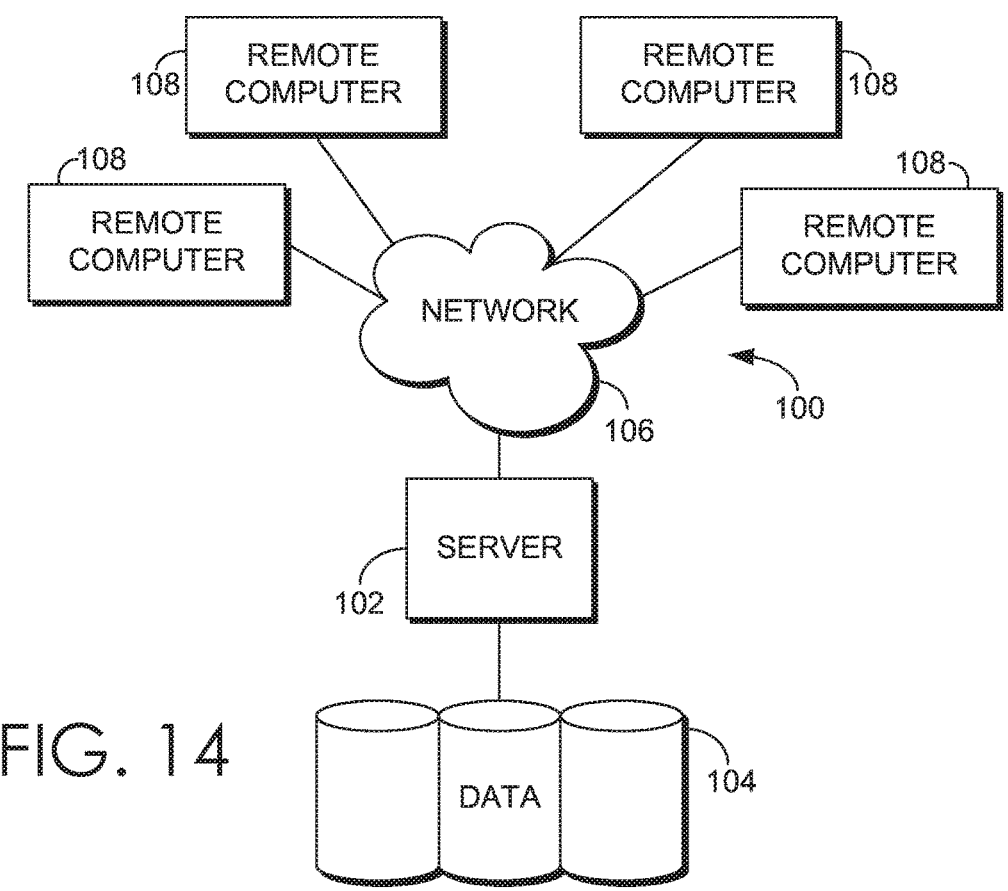
FIG. 14 is a block diagram illustrating aspects of an operating system environment suitable for practicing embodiments of the invention.

Referring to the drawings in general, and initially to FIG. 14 in particular, an exemplary computing system environment, on which embodiments of the present invention may be implemented is illustrated and designated generally as reference numeral 100. It will be understood and appreciated by those of ordinary skill in the art that the illustrated computing system environment 100 is merely an example of one suitable computing environment and is not intended to suggest any limitation as to the scope of use or functionality of the invention. Neither should the computing system environment 100 be interpreted as having any dependency or requirement relating to any single component or combination of components illustrated therein.

With continued reference to FIG. 14, the exemplary computing system environment 100 includes a general purpose computing device in the form of a server 102. Components of the server 102 may include, without limitation, a processing unit, internal system memory, and a suitable system bus for coupling various system components, including database cluster 104, with the server 102. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The server 102 typically includes, or has access to, a variety of devices capable of storing computer-readable media, for instance, database cluster 104. Computer-readable media can be any available media that may be accessed by server 102, and includes volatile and nonvolatile media, as well as removable and non-removable media. Computer-readable media may be physically stored on any number of devices and/or data structures. By way of example, and not limitation, computer-readable media may include computer storage media and communication media. Computer storage media may include, without limitation, volatile and non-volatile media, as well as removable and non-removable media implemented in any method or technology for storage of information, such as computer-readable instructions, data structures, program modules, or other data. In this regard, computer storage media may include, but is not limited to, RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the server 102. Computer storage media does not comprise signals per se. Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its evaluation criteria set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer readable media.

The computer storage media discussed above and illustrated in FIG. 14, including database cluster 104, provide storage of computer-readable instructions, data structures, program modules, and other data for the server 102. The server 102 may operate in a computer network 106 using logical connections to one or more remote computers 108. Remote computers 108 may be located at a variety of locations so that any number of devices and device types may be capable of integration on the network. The remote computers 108 may be personal computers, mobile devices, servers, routers, network PCs, peer devices, other common network nodes, or the like, and may include some or all of the components described above in relation to the server 102. The devices can be personal digital assistants or other like devices.

Exemplary computer networks 106 may include, without limitation, local area networks (LANs) and/or wide area networks (WANs). Such networking environments are commonplace in offices, enterprise-wide computer networks, intranets, and the Internet. When utilized in a WAN networking environment, the server 102 may include a modem or other means for establishing communications over the WAN, such as the Internet. In a networked environment, program modules or portions thereof may be stored in the server 102, in the database cluster 104, or on any of the remote computers 108. For example, and not by way of limitation, various application programs may reside on the memory associated with any one or more of the remote computers 108. It will be appreciated by those of ordinary skill in the art that the network connections shown are exemplary and other means of establishing a communications link between the computers (e.g., server 102 and remote computers 108) may be utilized.

In operation, a user may enter commands and information into the server 102 or convey the commands and information to the server 102 via one or more of the remote computers 108 through input devices, such as a keyboard, a pointing device (commonly referred to as a mouse), a trackball, or a touch pad. Other input devices may include, without limitation, microphones, satellite dishes, scanners, or the like. Commands and information may also be sent directly from a remote healthcare device to the server 102. In addition to a monitor, the server 102 and/or remote computers 108 may include other peripheral output devices, such as speakers and a printer.

Although many other internal components of the server 102 and the remote computers 108 are not shown, those of ordinary skill in the art will appreciate that such components and their interconnection are well known. Accordingly, additional details concerning the internal construction of the server 102 and the remote computers 108 are not further disclosed herein.

Although the invention has been described with reference to the embodiments illustrated in the attached drawing figures, it is noted that substitutions may be made and equivalents employed herein without departing from the scope of the invention. For example, additional steps may be added and steps omitted without departing from the scope of the invention. Many different arrangements of the various components depicted, as well as components not shown, are possible without departing from the spirit and scope of the present invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention. It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for implementing an evaluation tool to facilitate an evaluation of an application by multiple evaluators, wherein the evaluation tool is visible and operational at the same time as the application being evaluated by the multiple evaluators, the method comprising, for each evaluator within the multiple evaluators:
    providing, to a user device, an evaluation tool user interface simultaneously with an application user interface corresponding to the application being evaluated, wherein the evaluation tool user interface is a semitransparent overlay interface, and wherein functionality of the application user interface remains accessible along with functionality of the evaluation tool user interface;
    receiving an input from an evaluator within the multiple evaluators for initiating an evaluation of at least one feature of the application user interface;
    providing an evaluation criteria user interface for displaying one or more standardized selectable evaluation criteria to the evaluator, wherein each standardized selectable evaluation criteria of the one or more standardized selectable evaluation criteria has an associated rating that represents a quality of a feature of the application user interface;
    receiving a selection of at least one standardized selectable evaluation criteria of the one or more standardized selectable evaluation criteria from the evaluator;
    recording the selection of the at least one standardized selectable evaluation criteria in association with the at least one feature of the application user interface being evaluated;
    capturing one or more screen images corresponding to the currently rendered display of the user device, wherein the one or more screen images include an image depicting the selection of the at least one standardized selectable evaluation criteria, one or more inputs received from the evaluator, and one or more interactions of the evaluator with the application user interface and the evaluation tool;
    storing the at least one selected standardized selectable evaluation criteria, the at least one feature of the application user interface, and the one or more screen images as a completed evaluation session;
    determining a performance score for the application user interface being evaluated based on the completed evaluation session and the associated rating corresponding to the at least one selected standardized selectable evaluation criteria; and
    determining if the performance score meets a predetermined application performance score threshold.

2. The method of claim 1, wherein the standardized selectable evaluation criteria user interface is presented on a display of the user device at a location corresponding to the received input.

3. The method of claim 1, wherein the associated rating may represent one of a flawless rating, an intermediate rating, or an unsatisfactory rating.

4. The method of claim 1, wherein the one or more screen images comprise a video.

5. The method of claim 1, further comprising displaying an evaluation criteria categories menu for presenting one or more evaluation criteria categories.

6. The method of claim 5, wherein upon receiving a selection of an evaluation criteria category of the one or more evaluation criteria categories, displaying the one or more standardized selectable evaluation criteria corresponding to the selected evaluation criteria category.

7. The method of claim 1, further comprising presenting an evaluation criteria standards guide comprising one or more selectable evaluation criteria standards.

8. The method of claim 1, further comprising displaying one or more standard display feature representations via the evaluation tool user interface, wherein the one or more standard display feature representations provide a visual indication of a standardized display features layout of the application user interface.

9. The method of claim 8, further comprising automatically detecting display features within the application user interface and determining if the display features conform to the standardized display features layout.

10. One or more computer memory hardware having computer-executable instructions embodied thereon for performing a method for reviewing one or more completed evaluation sessions of an application completed by multiple evaluators using an evaluation tool, the method comprising:
    receiving and storing one or more completed evaluation sessions for a first application of a plurality of applications, wherein each completed evaluation session of the one or more completed evaluation sessions comprises:
        a recording of a selection of at least one standardized selectable evaluation criteria corresponding to at least one feature of an application user interface, wherein the selection is made by an evaluator within the multiple evaluators; and
        one or more screen images including an image depicting the selection of the at least one standardized selectable evaluation criteria selected by the evaluator, one or more inputs received from the evaluator, and one or more interaction of the evaluator with the application user interface and the evaluation tool, wherein the evaluation tool was provided to a user device associated with the evaluator, as a semitransparent overlay interface simultaneously with the application user interface;
    determining an application performance score for the first application of the plurality of applications based on the each completed evaluation session of the one or more completed evaluation sessions and one or more ratings associated with the at least one standardized selectable evaluation criteria, wherein the application performance score is determined for each completed evaluation session of the one or more completed evaluation sessions, and determining if the application performance score meets a predetermined application performance score threshold; and presenting an evaluation results user interface for displaying the application performance score for each of the one or more completed evaluation sessions and at least one contextualized evaluation package corresponding to the one or more completed evaluation sessions.

11. The one or more memory hardware of claim 10, wherein the one or more ratings associated with the at least one standardized selectable evaluation criteria comprise a value representing a quality of a feature of the application user interface.

12. The one or more memory hardware of claim 10, wherein the at least one contextualized evaluation package corresponding to the one or more completed evaluation sessions is selectable.

13. The one or more memory hardware of claim 12, wherein the at least one contextualized evaluation package includes the one or more screen images.

14. The one or more memory hardware of claim 13, further comprising presenting an evaluation package review interface having a review navigation control that allows a reviewer to navigate the one or more screen images.

15. The one or more memory hardware of claim 10, further comprising receiving one or more completed evaluation sessions for a second application.

16. The one or more memory hardware of claim 15, further comprising presenting a comprehensive evaluation results interface including evaluation results corresponding to the one or more completed evaluation sessions for the first application and the second application.

17. A system for providing, on a user device, a contextualized application evaluation session to multiple evaluators, and an evaluation review system, the system comprising:
 a processor;
 an evaluation tool user interface generating component for generating an evaluation tool user interface simultaneously with an application user interface of an application being evaluated, wherein the evaluation tool is a semitransparent overlay interface, wherein the evaluation tool user interface and the application user interface are generated for each evaluator of the multiple evaluators, and wherein functionality of the application user interface remains accessible along with functionality of the evaluation tool user interface;
 an evaluation criteria user interface generator for generating an evaluation criteria user interface comprising one or more standardized selectable evaluation criteria having a rating that represents a quality of a feature of the application user interface, and receiving, from the each evaluator of the multiple evaluators, a selection of at least one standardized selectable evaluation criteria of the one or more standardized selectable evaluation criteria;
 an evaluation interaction tracking component for recording input from the each evaluator of the multiple evaluators, and selection of at least one standardized selectable evaluation criteria of the one or more standardized selectable evaluation criteria in association with the feature of the application user interface for the each evaluator of the multiple evaluators;
 a display capturing component for capturing one or more screen images corresponding to a currently rendered display of the user device, wherein the one or more screen images include an image depicting the selection of the at least one standardized selectable evaluation criteria by the each evaluator, and one or more interactions of the each evaluator with the application user interface and the evaluation tool user interface; and
 a performance score component for determining a performance score for the contextualized application evaluation session of the application user interface being evaluated by the each evaluator of the multiple evaluators and an associated rating corresponding to the at least one standardized selectable evaluation criteria, and for determining whether the performance score meets a predetermined application performance score threshold.

18. The system of claim 17, further comprising an evaluation review component configured to generate an evaluation results user interface having the performance score for the contextualized evaluation session of the each evaluator of the multiple evaluators, and one or more selectable contextualized evaluation packages.

19. The system of claim 18, wherein the one or more selectable contextualized evaluation packages comprise the one or more screen images.

20. The system of claim 18, further comprising a comprehensive evaluation results compiler configured to generate evaluation results corresponding to the plurality of applications evaluated using the evaluation tool for presentation on an evaluation results user interface.

* * * * *